United States Patent
Stirling-Gallacher et al.

(10) Patent No.: US 9,749,103 B2
(45) Date of Patent: Aug. 29, 2017

(54) SYSTEM AND METHOD FOR TRANSMITTING BEAMFORMED REFERENCE/CONTROL SIGNALS

(71) Applicant: Futurewei Technologies, Inc., Plano, TX (US)

(72) Inventors: Richard Stirling-Gallacher, San Diego, CA (US); Bin Liu, San Diego, CA (US); Jian Wang, Beijing (CN)

(73) Assignee: FUTUREWEI TECHNOLOGIES, INC., Plano, TX (US)

(*) Notice: Subject to any disclaimer, the term of this patent is extended or adjusted under 35 U.S.C. 154(b) by 2 days.

(21) Appl. No.: 14/815,571

(22) Filed: Jul. 31, 2015

(65) Prior Publication Data

US 2017/0033904 A1    Feb. 2, 2017

(51) Int. Cl.
| | | |
|---|---|---|
| *H04L 5/00* | (2006.01) | |
| *H04L 5/22* | (2006.01) | |
| *H04B 7/06* | (2006.01) | |
| *H04W 72/04* | (2009.01) | |

(52) U.S. Cl.
CPC .......... *H04L 5/0048* (2013.01); *H04B 7/0617* (2013.01); *H04L 5/22* (2013.01); *H04W 72/0406* (2013.01)

(58) Field of Classification Search
None
See application file for complete search history.

(56) References Cited

U.S. PATENT DOCUMENTS

| | | | | |
|---|---|---|---|---|
| 7,339,979 B1 * | 3/2008 | Kelkar | ............... | H04B 7/0408 375/147 |
| 7,394,858 B2 * | 7/2008 | Sadowsky | ............ | H04B 7/0408 375/260 |
| 2010/0323711 A1 | 12/2010 | Damnjanovic et al. | | |
| 2012/0281657 A1 | 11/2012 | Ding et al. | | |
| 2014/0023040 A1 | 1/2014 | Son et al. | | |
| 2014/0269493 A1 | 9/2014 | Forenza et al. | | |
| 2015/0282133 A1 | 10/2015 | Kakishima et al. | | |

(Continued)

FOREIGN PATENT DOCUMENTS

| | | |
|---|---|---|
| CN | 102123525 A | 7/2011 |
| CN | 104770003 A1 | 7/2015 |

OTHER PUBLICATIONS

Vodafone, "Cooperative Multipoint Performance Evaluation Based on Simulation and Trial Measurements in Easy-C Project", 3GPP TSG RAN WG1 Meeting #61bis, R1-104122, Agenda Item 6.3, Dresden, Germany, Jun. 28, Jul. 2, 2010, 8 pages.

(Continued)

*Primary Examiner* — Hong Cho
(74) *Attorney, Agent, or Firm* — Slater Matsil, LLP

(57) ABSTRACT

A method for operating a transmission point with reduced interference includes determining a beamformed signal configuration specified in accordance with configuration information of neighboring TPs, wherein the beamformed signal configuration indicates multiplexed beamformed signals in a spatial domain and at least one of a time domain and a frequency domain, and transmitting beamformed signals in accordance with the beamformed signal configuration, wherein the beamformed signals comprises at least one of beamformed reference signals and beamformed control signals.

28 Claims, 32 Drawing Sheets

(56) References Cited

U.S. PATENT DOCUMENTS

2016/0087765 A1\* 3/2016 Guey .................. H04L 27/2613
370/330

OTHER PUBLICATIONS

Lee, J., et al., "Coordinated Multipoint Transmission and Reception in LTE-Advanced Systems," IEEE Communications Magazine, vol. 50, No. 11, Nov. 2012, 7 pages.
Nam, Y-H., et al., "Evolution of Reference Signals for LTE-Advanced Systems," IEEE Communications Magazine, vol. 50, No. 2, Feb. 2012, 7 pages.
Taori, R., et al., "Cloud Cell: Paving the Way for Edgeless Networks," IEEE Global Communications Conference, Dec. 9-13, 2013, 7 pages.
Ahmed, E., et al., "Rate Gain Region and Design Tradeoffs for Full-Duplex Wireless Communications," Wireless Communications, IEEE Transactions, vol. 12, No. 7, Jul. 2013, pp. 3556-3565.
Duarte, M., et al., "Full-Duplex Wireless Communications Using Off-The-Shelf Radio: Feasibility and First Results,"Signals, Systems, and Computers (ASILOMAR), 2010 Conference Record of the Forty Fourth Asilomar Conference, Nov. 7-10, 2010, pp. 1558-1562.
Jain, M., et al., "Practical, Real-time, Full Duplex Wireless," sing.stanford.edu/pubs/mobicom11-duplex.pdf, downloaded Jul. 9, 2015, 12 pages.
Sabharwal, A., "In-Band Full-Duplex Wireless: Challenges and Opportunites," IEEE Journal on Selected Areas in Communications, vol. 32, No. 9, Sep. 2014, pp. 1637-1652.

\* cited by examiner

SHADED SECTORS SHOW AREAS OF ACTIVE BEAM-FORMED CONTROL/REFERENCE SIGNALS FOR ALL AZIMUTH BEAMS, BUT ONLY FOR HIGH ELEVATION BEAM DIRECTION

UNSHADED SECTORS SHOW AREAS OF ACTIVE BEAM-FORMED CONTROL/REFERENCE SIGNALS FOR ALL AZIMUTH BEAMS, BUT ONLY FOR LOW ELEVATION DIRECTION

SYSTEM AND METHOD FOR TRANSMITTING BEAMFORMED REFERENCE/CONTROL SIGNALS

TECHNICAL FIELD

The present disclosure relates generally to digital communications, and more particularly to a system and method for transmitting beamformed reference and/or control signals.

BACKGROUND

In millimeter wave (mmWave) communications, beamforming has been used to overcome the expected path losses inherent in mmWave communications. Depending upon the path loss between a transmission point (TP) and a user equipment (UE), different levels of beamforming gain may be needed for transmitting data on different TP to UE links. Reference and/or control signals are used in communications systems to enable channel estimation, estimate interference, assist synchronization, and so on. Therefore, the reference and/or control signals are expected to be receivable by all of the UEs, even in the high path loss environment of mmWave communications. Beamforming of the reference and/or control signals is one way to combat the path loss. However, beamforming the reference and/or control signals in all the directions needed lead to high signaling overhead, which reduces the overall communications system data rate.

SUMMARY OF THE DISCLOSURE

Example embodiments provide a system and method for transmitting beamformed reference and/or control signals.

In accordance with an example embodiment, a method for operating a device is provided. The method includes determining, by the device, a beamformed signals configuration of a first transmission point (TP) in accordance with configuration information of the first TP and configuration information of neighboring TPs, wherein the beamformed signals configuration indicates multiplexed beamformed signals in a spatial domain and at least one of a time domain and a frequency domain, and wherein the beamformed signals comprises at least one of beamformed reference signals and beamformed control signals, and instructing, by the device, use of the beamformed signals configuration.

In accordance with another example embodiment, a method for operating a user equipment (UE) is provided. The method includes receiving, by the UE, configuration information regarding a beamformed signal configuration from a transmission point (TP), wherein the configuration information includes information regarding a multiplexing of beamformed signals in a spatial domain and at least one of a time domain and a frequency domain, and wherein the beamformed signals comprises at least one of beamformed reference signals and beamformed control signals, and receiving, by the UE, a subset of the beamformed signals in accordance with the information.

In accordance with another example embodiment, a device is provided. The device includes a processor, and a computer readable storage medium storing programming for execution by the processor. The programming including instructions to configure the device to determine a beamformed signals configuration of a first transmission point (TP) in accordance with configuration information of the first TP and configuration information of neighboring TPs, wherein the beamformed signals configuration indicates multiplexed beamformed signals in a spatial domain and at least one of a time domain and a frequency domain, and wherein the beamformed signals comprises at least one of beamformed reference signals and beamformed control signals, and instruct use of the beamformed signals configuration.

Practice of the foregoing embodiments enable a reduction in signaling overhead by multiplexing the beamformed reference and/or control signals, which helps to improve overall communications system performance.

Moreover, the coordination between transmission points helps enables configuration of the multiplexing of the beamformed reference and/or control signals to reduce interference to closely located transmission points and UEs.

BRIEF DESCRIPTION OF THE DRAWINGS

For a more complete understanding of the present disclosure, and the advantages thereof, reference is now made to the following descriptions taken in conjunction with the accompanying drawing, in which.

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the embodiments disclosed herein, and do not limit the scope of the disclosure.

One embodiment relates to transmitting beamformed reference and/or control signals. For example, a transmission point determines a beamformed signal configuration specified in accordance with configuration information of neighboring TPs, wherein the beamformed signal configuration indicates multiplexed beamformed signals in a spatial domain and at least one of a time domain and a frequency domain, and transmits beamformed signals in accordance with the adjusted beamformed signal configuration, wherein the beamformed signals comprises at least one of beamformed reference signals and beamformed control signals.

The present disclosure will be described with respect to example embodiments in a specific context, namely communications systems that beamformed reference and/or control signals. The embodiments may be applied to standards compliant communications systems, such as those that are compliant with Third Generation Partnership Project (3GPP), IEEE 802.11, and the like, technical standards, and non-standards compliant communications systems, that use beamformed reference and/or control signals.

Figure 1:
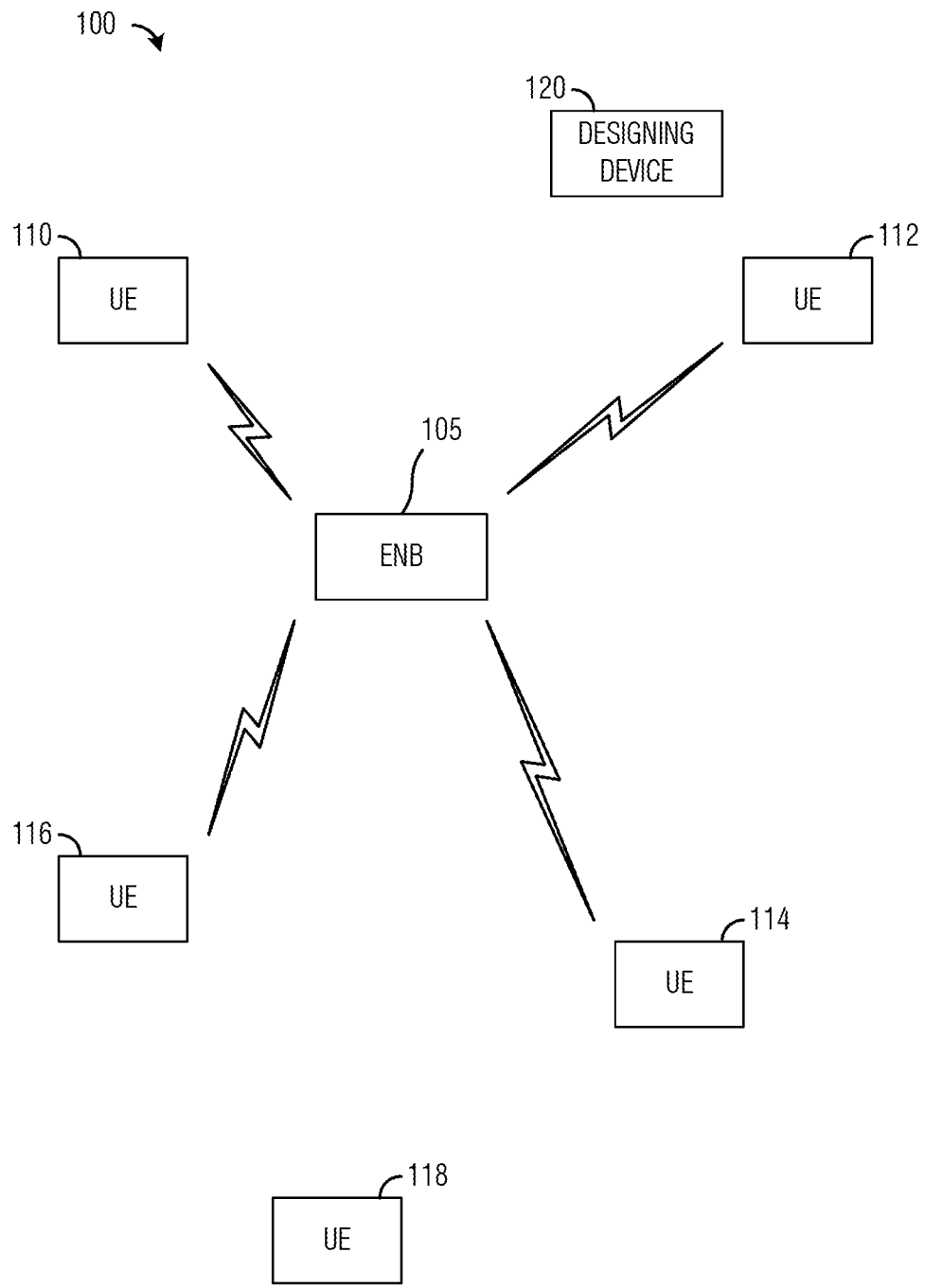
FIG. 1 illustrates an example communications system according to example embodiments described herein.

FIG. 1 illustrates an example communications system 100. Communications system 100 includes an evolved NodeB (eNB) 105 serving a plurality of user equipments (UEs), such as UE 110, 112, 114, and 116. In a first operating mode, transmissions for UEs as well as transmissions by UEs pass through eNB 105. eNB 105 allocates communications resources for the transmissions to or from the UEs. eNBs may also be commonly referred to as base stations, NodeBs, remote radio heads, or access points, and the like, while UEs may also be commonly referred to as mobiles, mobile stations, terminals, subscribers, users, and the like. Communications resources may be time resources, frequency resources, code resources, time-frequency resources, and the like.

While it is understood that communications systems may employ multiple eNBs capable of communicating with a number of UEs, only one eNB, and a number of UEs are illustrated for simplicity.

Reference and/or control signals, such as channel state information reference signals (CSI-RS), broadcast control channel (BCCH), primary synchronization signals (PSS), secondary synchronization signals (SSS), demodulation reference signal (DMRS), and the like, are transmitted by transmission points (TPs) to help UEs perform channel estimation, measure interference, demodulate received transmissions, perform synchronization, receive control information, and so forth. Most of these reference and/or control signals are broadcast to multiple UEs operating in a cell (a coverage area of a TP) and are typically not intended for a single UE (the exception being the DMRS from the above listed reference and/or control signals, which is a user specific reference signal). These reference and/or control signals are referred to as common control signals or cell-specific control signals, as opposed to UE-specific signals (i.e., DMRS) which are intended for a single UE (or a UE group). Examples of TPs may include base stations, NodeBs, eNodeBs (eNB), remote radio heads, access points, relays, and the like.

Communications system 100 may include a designing device 120. Designing device 120 is configured to design or specify a configuration of beamformed reference and/or control signals for communications system 100. Designing device 120 may be a standalone entity as shown or designing device 120 may be co-located with a network entity such as an eNB, a centralized communications controller, and the like.

Figure 2:
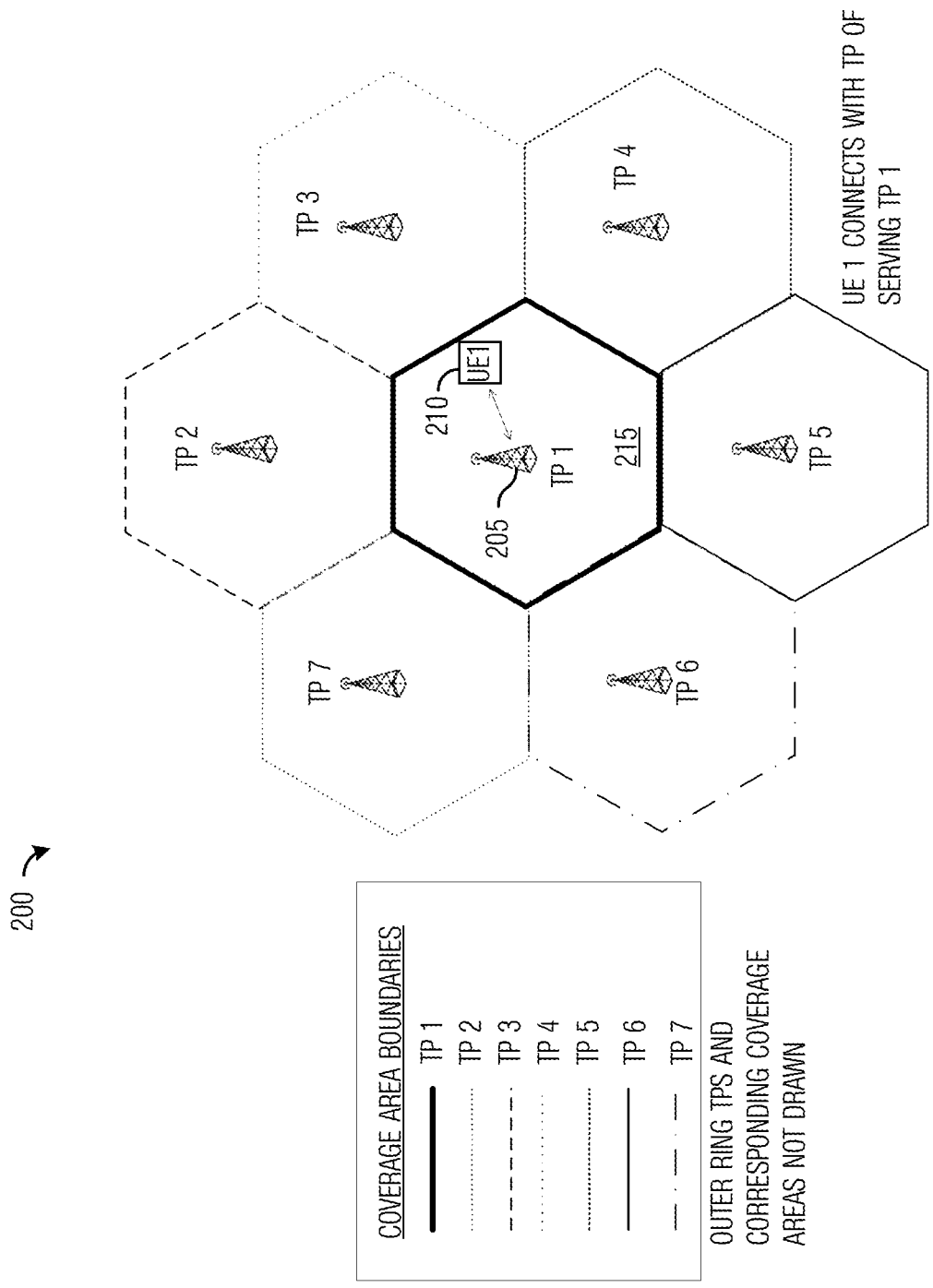
FIG. 2 illustrates an example traditional cellular communications system according to example embodiments described herein.

FIG. 2 illustrates an example traditional cellular communications system 200. Cellular communications system 200 may include a TP (such as TP 205) that serves UEs (such as UE 210) that are operating in a coverage area 215. Neighboring TPs (of the same tier level) serve neighboring coverage areas. The coverage areas may also be referred to as cells. The coverage areas of cellular communications systems are often drawn as hexagons, but in reality, the coverage area of each TP may be irregular in shape, depending upon the terrain and environment. There is often some overlap of the coverage areas, usually at edges. However, for simplicity, the coverage areas are shown herein as hexagons.

In a heterogeneous communications system (HetNet), the TPs have different coverage areas (or tier levels) and TPs with smaller coverage areas (referred to herein as small cells or low power cells) may be contained at least partly in the coverage area of a larger TP (referred to herein as a macro cell or high power cell). A variety of techniques (such as enhanced inter-cell interference coordination (eICIC), further enhanced ICIC (FeICIC), and the like) have been proposed to control interference between data transmissions in different tier levels of HetNets.

Figure 3:
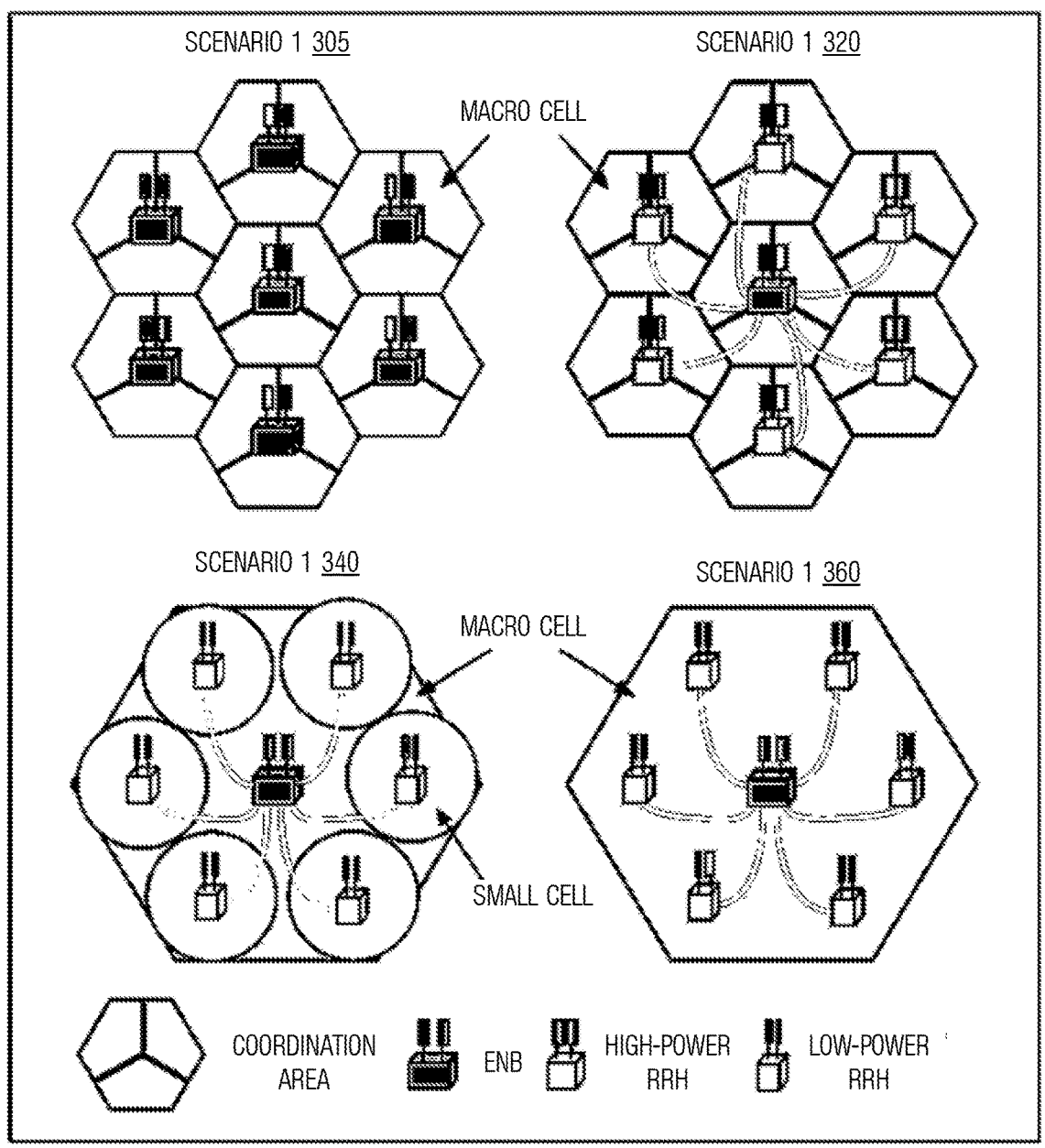
FIG. 3 illustrates four different deployment scenarios for coordinated multipoint transmission according to example embodiments described herein.

Coordinated multipoint (COMP) transmission was introduced in 3GPP Long Term Evolution (LTE) Release-11. In COMP transmission, multiple TPs coordinate and transmit data to a UE. FIG. 3 illustrate four different deployment scenarios 300 for COMP transmission. Scenario 1 305 covers intra-site collaboration for homogeneous networks and scenario 2 320 covers inter-site collaboration for homogeneous networks. Scenarios 3 340 and 4 360 cover HetNets. Scenario 4 360 is a special case since remote radio heads (RRHs) have the same cell ID as the macro TP (macro eNB or high power TP) and form a set of distributed antennas for the high power TP. In order to enable common control signals, such as CSI-RS, DMRS, and so on, a virtual cell ID was introduced. In order to enable reporting from the UEs in a COMP measurement set to different TPs, multiple CSI-RS reporting processes and interference measurement resources (IMR) were introduced in 3GPP LTE Release-11.

Figure 4:
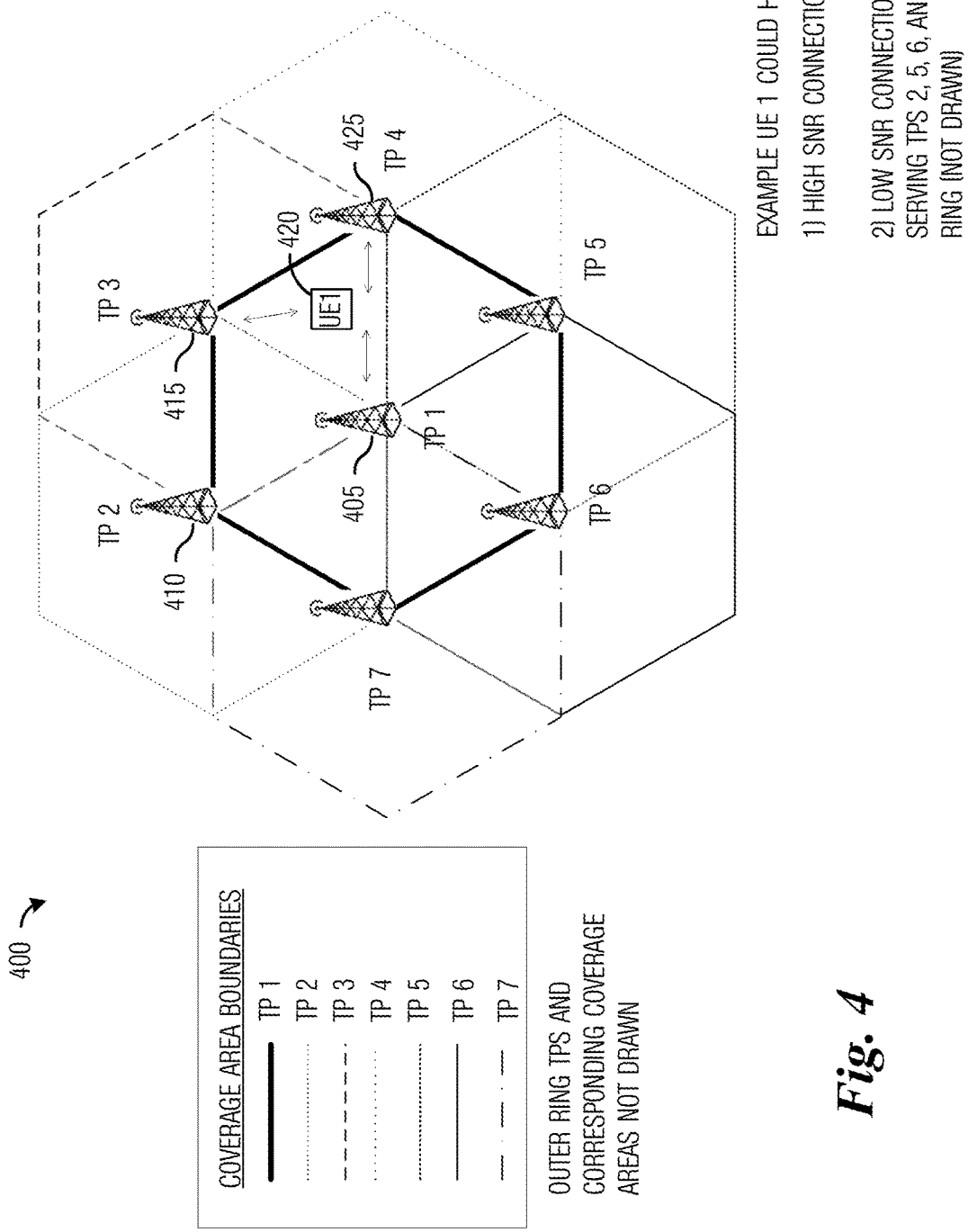
FIG. 4 illustrates an example communications system with a large degree of overlap in the coverage areas of TPs in communications system according to example embodiments described herein.

FIG. 4 illustrates an example communications system 400 with a large degree of overlap in the coverage areas of TPs in communications system 400. In general, an extension of COMP (in particular COMP scenario 4 360), communications system 400 includes TPs with coverage areas that overlap one another to a much greater extent than in previous communications systems. As shown in FIG. 4, TP1 405 is located at the outer edges of the coverage areas of its neighboring TPs, such as TP2 410, TP3 415, TP4 425, and so forth. Communications system 400 increases the potential number of UEs involved in collaborative operation (the number of UEs in the COMP measurement sets). As with traditional COMP, a low latency connection between the TPs is needed. Usually, with such a high degree of overlap, each UE, such as UE 420, can connect to multiple spatially separated TPs with much higher signal to noise ratios (SNRs), such as TP1 405, TP3 415, and TP4 425, than in more conventional systems. The higher SNR connections to spatially separated TPs may enable distributed multiple input multiple output (MIMO) techniques, such as distributed input distributed output (DIDO).

However, the dedicated low latency connection between the TPs may need to have significantly higher bandwidth to support the larger amount of collaboration between the TPs. To supply the higher bandwidth required a dedicated low latency connection may be implemented in-band using the mmWave band itself. In such an ultra-dense deployment of TPs with overlapping coverage areas, if a high bandwidth connection from one TP to another TP is broken, the TP may be turned off. Due to density of TPs any affected UE may be connected to one or more of the surrounding TPs. Alternatively, the TP and its neighbor TPs may reduce transmit power to reduce their coverage area sizes and continue operating as more traditional TPs with little or no coverage area overlap and reduced collaboration. To improve energy efficiency in an overlapped communications system, such as communications system 400 TPs that are lightly loaded (or have no load at all) may enter a sleep mode to reduce power consumption. Communications system 400, which may be considered to be a set of connected TPs or a "cloud" may follow a UE as the UE moves through the coverage areas of the TPs. One TP may act as a central controller, which may be dynamically assigned to a UE as it moves through the cloud.

The TPs with high SNR connections to a particular UE (e.g., TP1 405, TP3 415, and TP4 425 for UE 420) may perform coordinated scheduling and/or coordinated beamforming (with beamforming from each TP), dynamic point selection and/or blanking, as well as joint beamforming from all TPs in a DIDO sense with increasing levels of performance. In a mmWave communications system, such a configuration increases the reliability of the TP to UE connection tremendously and provides protection against blockage paths (also commonly referred to as link fragility) by way of the spatial diversity afforded by the surrounding TPs.

According to an example embodiment, systems and methods for multiplexing beamformed reference and/or control signals in mmWave communications systems are provided. Reference and/or control signals in mmWave communications systems need to be beamformed to provide sufficient SNR performance in the high path loss environment of the mmWave communications systems, while the multiplexing of the beamformed reference and/or control signals allows for reduced signaling overhead and reduced interference from adjacent TPs.

In order to support communications in a mmWave communications system, beamforming is generally needed to overcome the link budget. Cell-specific reference and/or control signals (such as, CSI-RS, BCCH, PSS, SSS, and so forth) and UE-specific reference and/or control signals (such as DMRS, and the like) that are transmitted from each TP may be beamformed so that UEs located at the edge of coverage areas can receive the signals with sufficiently high SNR. It may be possible that some control signals, such as BCCH, may not need to be transmitted by every TP, but to facilitate data transmission and/or data reception from every TP, at least reference signals (such as CSI-RS, DMRS, and so forth) need to be transmitted. The discussion presented herein focuses on the CSI-RS reference signals, however, the example embodiments discussed are operable with any reference and/or control signal.

To minimize the effects of interference received by a UE from transmissions of multiple TPs (which will generally become worse as the coverage areas of the TPs overlap to greater extents), the cell-specific reference signals for traditional 3GPP LTE communications systems are multiplexed in time and frequency domains in each resource block (RB) for each TP.

Figure 5:
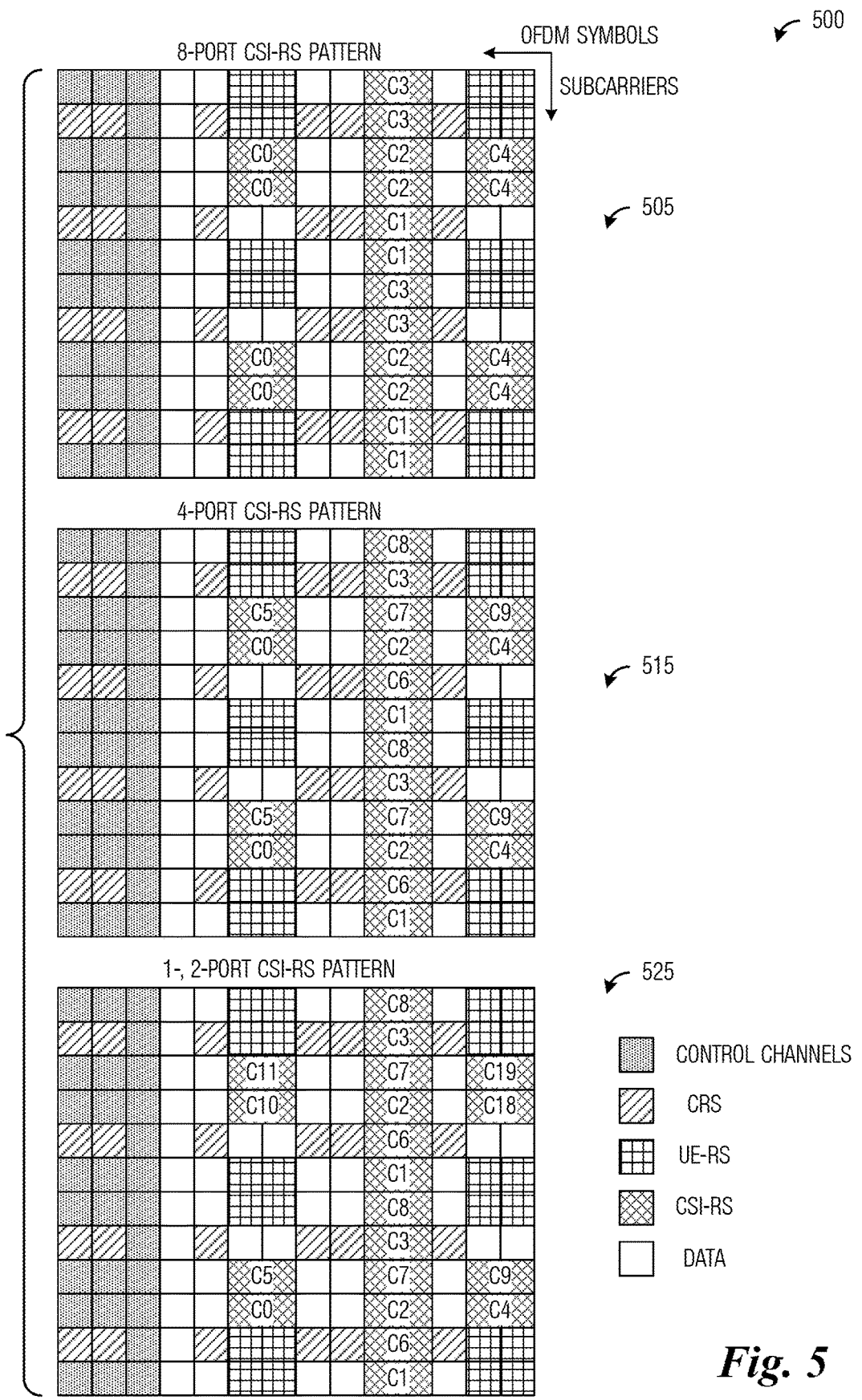
FIG. 5 illustrate resource element (RE) usage patterns of physical resource blocks (PRBs) for a variety of port configurations according to example embodiments described herein.

FIG. 5 illustrate resource element (RE) usage patterns 500 of physical resource blocks (PRBs) for a variety of port configurations. RE usage patterns 500 display RE allocations for different signals of a PRB of a 3GPP LTE-A compliant communications system. A first PRB 505 illustrates the RE allocations for a PRB with an 8-port configuration, a second PRB 515 illustrates the RE allocations for a PRB with a 4-port configuration, and a third PRB 525 illustrates RE allocations for a PRB with a 1- or 2-port configuration.

In a PRB with a 1- or 2-port configuration (third PRB 525), each TP has 1 or 2 CSI-RS ports and therefore uses one RE group of a plurality of grouped REs (code division multiplexing (CDM) multiplexed) labeled C0 to C19 to transmit the CSI-RS. Therefore, up to 20 different TPs may use different time-frequency resources to transmit their respective CSI-RS. Similarly, in a PRB with an 8-port configuration (first PRB 505), each TP has 8 CSI-RS ports and therefore uses one RE group of a plurality of grouped REs labeled C0 to C4 to transmit the CSI-RS. Hence, up to 5 different TPs may use different time-frequency resources to transmit their respective CSI-RS. In a PRB with a 4-port configuration (second PRB 515), each TP has 4 CSI-RS ports using one RE group of a plurality of grouped REs labeled C0 to C9 to transmit their respective CSI-RS. Thus, up to 10 different TPs may use different time-frequency resources to transmit their respective CSI-RS.

According to an example embodiment, different spatial multiplexing systems and methods are provided for different deployments of cellular communications systems.

Figure 6A:
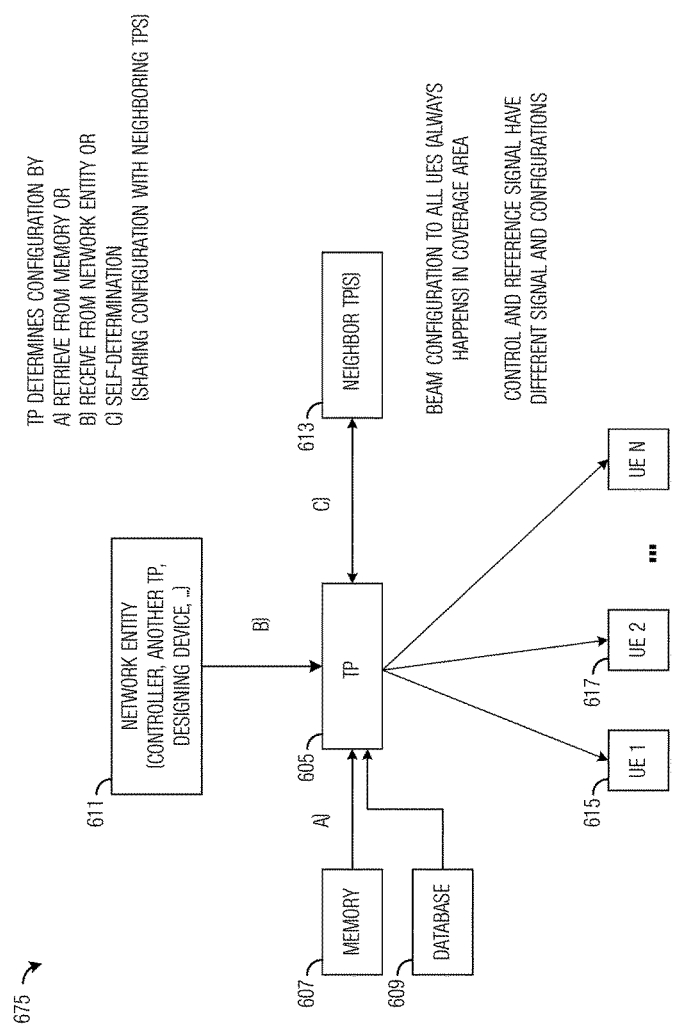
FIG. 6A illustrates an example communications system highlighting the determination of a beamformed cell-specific reference and/or control signal configuration according to example embodiments described herein.

FIG. 6A illustrates an example communications system 600 highlighting the determination of a beamformed cell-specific reference and/or control signal configuration. Depending on the deployment of a communications system, several different devices may perform the determination of the beamformed cell-specific reference and/or control signal configuration. In a first scenario, the beamformed cell-specific reference and/or control signal configuration is specified by a technical standard or an operator of the communications system and the beamformed cell-specific reference and/or control signal configuration may be saved in a memory or a database for later retrieval. In a second scenario, a network entity (such as an eNB, a centralized communications controller, a designing device, and the like) may determine the beamformed cell-specific reference and/or control signal configuration and the beamformed cell-specific reference and/or control signal configuration may be signaled to a TP. In a third scenario, the TP may determine the beamformed cell-specific reference and/or control signal configuration by coordinating with neighboring TPs to share configuration information about active reference signals, active control signals, available frequency resources, available time resources, sectorization information, information about low power TPs operating within coverage areas, and so forth. The TP may determine the beamformed cell-specific reference and/or control signal configuration in accordance with the configuration information.

Communications system 600 includes a TP 605. TP 605 may determine the beamformed cell-specific reference and/or control signal configuration by retrieving the beamformed cell-specific reference and/or control signal configuration from a memory 607 or a database 609. Alternatively, a network entity 611 may specify the beamformed cell-specific reference and/or control signal configuration and TP 605 may determine the beamformed cell-specific reference and/or control signal configuration when it receives signaling from network entity 611. Alternatively, TP 605 may determine the beamformed cell-specific reference and/or control signal configuration by specifying the beamformed cell-specific reference and/or control signal configuration through coordination with neighboring TP(s) 613 and multiplexing the beamformed cell-specific reference and/or control signals in accordance with information shared during the coordination. TP 605 provides information about the beamformed cell-specific reference and/or control signal configuration to UEs, such as UE 615 and UE 617.

Figure 6B:
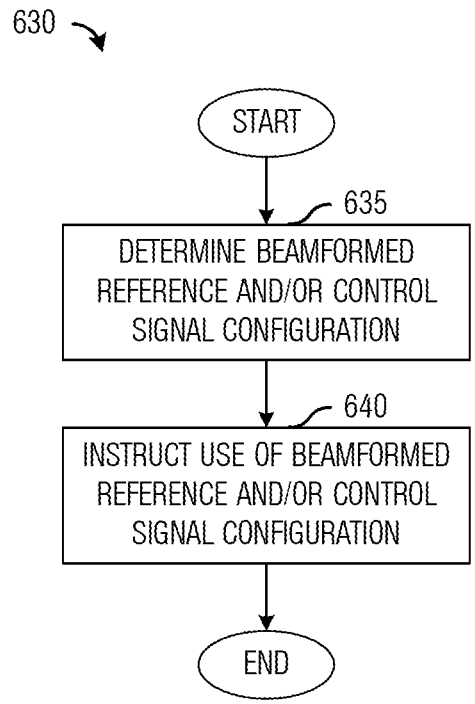
FIG. 6B illustrates a flow diagram of example operations occurring in the multiplexing of beamformed cell-specific reference and/or control signals according to example embodiments described herein.

FIG. 6B illustrates a flow diagram of example operations 630 occurring in the configuration of multiplexed beamformed cell-specific reference and/or control signals. Operations 630 may be indicative of operations occurring in a communications device, such as a network entity or a TP, that is configuring multiplexed beamformed cell-specific reference and/or control signals.

Operations 630 may begin with the communications device determining a beamformed reference signal and/or control signal configuration (block 635). The beamformed reference signal and/or control signal configuration may be determined in a static manner, or a dynamic manner.

In a static manner, the beamformed reference signal and/or control signal configuration may be specified in a technical standard or by an operator of the communications system. The beamformed reference signal and/or control signal configuration may be saved in a local memory of the TPs. Determining the beamformed reference signal and/or control signal configuration, in the static manner, may involve a TP retrieving the beamformed reference signal and/or control signal configuration from a local or remote memory. Alternatively, the beamformed reference signal and/or control signal configuration may be stored in a local or a remote database and the communications device can access the database to retrieve the beamformed reference signal and/or control signal configuration. The TP may instruct use of the beamformed reference signal and/or control signal configuration by signaling information regarding the beamformed reference signal and/or control signal configuration (block 640).

In a first dynamic manner, a network entity (e.g., a high power TP, a macro TP, a centralized controller, a dedicated designing device, and the like) may determine the beamformed reference signal and/or control signal configuration by multiplexing the beamformed reference signal and/or control signal in a spatial domain and at least one of a time domain and a frequency domain (block 635). Detailed discussion of the multiplexing of the beamformed reference signal and/or control signal configuration is provided below. The network entity may instruct use of the beamformed reference signal and/or control signal configuration to the TPs by using higher layer signaling or through an X2 interface (block 640). Alternatively, the TPs may query the network entity to retrieve the beamformed reference signal and/or control signal configuration. In another alternative fashion, the network entity may save the beamformed reference signal and/or control signal configuration to a database and the TPs may retrieve the beamformed reference signal and/or control signal configuration from the database. The network entity may update the beamformed reference signal and/or control signal configuration as needed, such as when a TP is added to the communications system, when a TP becomes faulty and is removed from the communications system, when a performance metric (such as an error rate, a SINR, a SNR, and the like) meets a specified threshold, or when a irregular special event occurs (i.e., emergency or concert and/or sporting event) or regular event occurs (such as time of day, a day of week, a holiday or regular sporting event and/or concert) occurs which causes a large redistribution of users and so on.

The network entity may provide the following information to the TPs, either in a direct manner (such as by higher layer signaling, X2 messaging, and so on) or in an indirect manner (such as by saving the information to a memory or database): time and/or frequency resource mapping for different beamformed directions (also included may be rate or timing cycle in which the beamformed reference and/or control signals are sounded; and a mapping of transmission beam indices to codewords or time slots. Additional information that the network entity may provide to the TPs (but in some implementations, the TPs may determine independently) include: sector-specific scrambling codes (assuming that the TPs serve more than one sector); cell-specific scrambling code; feedback mode options; and maximum number of feedback processes. It is noted that the list provided above may not be an exclusive list and that other information may be provided by the network entity.

In a second dynamic manner, a TP may determine the beamformed reference signal and/or control signal configuration (block 635). The TPs may coordinate with neighboring TP to determine the beamformed reference signal and/or control signal configuration. The coordinating with the neighboring TPs involves the TPs sharing configuration information with one another and then the TP multiplexes the beamformed reference signals and/or control signals. The coordinating and the multiplexing occurs iteratively so that the TPs are able to share the configuration information after successive multiplexing operations have taken place to help ensure that the changes to the multiplexing of the beamformed reference and/or control signals are actually helping to reduce interference rather than increase interference. The coordinating occurs over a shared link between the TPS. The shared link may be a dedicated wireline or wireless connection. The shared link may be a portion of the communications system resources of the communications system. Examples of the configuration information may include, but are not limited to: sector configuration (e.g., number of sectors, and width of sectors), cell-specific reference and/or control signal configuration (e.g., the reference and/or control signals that will be multiplexed and beamformed, the reference and/or control signals that will not be multiplexed nor beamformed, and so forth), identification information (e.g., cell ID, virtual cell ID, and so on), transmission beam information (e.g., number of transmission beams, direction of transmission beams, width of transmission beams, and the like), spatial domain information, time domain information, frequency domain information, and so on. Alternatively, the shared configuration information is received from an entity in the communications system, a database in the communications system, a remote database, and the like. The TP multiplexes its beamformed reference and/or control signals based on the shared configuration information.

The TP may instruct use of the beamformed reference and/or control signal configuration to the UEs (block 640). The TP may provide the following information about the beamformed reference signal configuration to the UEs: locations of resources including beamformed signals, mappings of the resources to coverage area sectors and TPs, a rate in which the beamformed signals are sounded, mappings of transmission beam indices to one of code words and time slots, an indicator of a use of sector-specific scrambling codes, scrambling code indices, UE feedback scheme (i.e., channel quality indicator (CQI), reference signal received power (RSRP), received signal strength indicator (RSSI), and so forth), a maximum number of feedback processes, and so on. The TP may provide the following information about beamformed control signal configuration to the UEs: locations of resources including beamformed signals, mappings of the resources to coverage area sectors and TPs, a rate in which the beamformed signals are sounded, mappings of transmission beam indices to one of code words and time slots, and so forth. Such a configuration message for the beamformed reference signals may be conveyed to the UE using the channel state information-reference signal (CSI-RS) configuration message. The configuration for the beamformed control signals maybe transmitted to the UE via a broadcast control channel (BCCH).

The determining of the beamformed reference and/or control signal configuration may follow a variety of multiplexing rules. The multiplexing rules may include:

In a homogeneous communications system, the beamformed reference and/or control signals are adjusted so that only one TP actively sounds a coverage area edge adjacent to a neighboring TP in a particular time instance and frequency band. In a homogeneous deployment, adjacent TPs sound on a group of transmission beams so that only 1 TP sounds (i.e., a sounding TP) an adjacent coverage area edge at one time instance and/or frequency band. The sounding TP may change with time instance and/or frequency band. Within a coverage area, sounding beamformed reference and/or control signals in every second (60 degree) sector minimizes resource utilization.

In a communications system where the TPs have overlapping coverage areas, only one TP actively sounds an overlapping area at any particular time instance and/or frequency band. Beams from only 1 TP actively sound the overlapping area in any particular time instance and/or frequency band. The sounding TP changes with time instance and/or frequency band. Within the overlapping area, groups of transmission beams from each TP to be active every third sector minimizes resource utilization.

In a HetNet, TPs that are serving pico coverage areas (or low power coverage areas) sound only when sectors of a high power TP in which it is located are not being sounded by the high power TP. The pico TP (or low power TP) sounds on only every second 60-, 120-, or 180-degree sector when the sectors of the high power TP in which it is located are not being sounded by the high power TP. Additionally, the active sector of the low power TP are changed with time instance and/or frequency band so that all of the sectors of the low power TP are sounded.

In a TP, groups of transmission beams that are angularly separated (e.g., transmission beams that are separated by 60-, 120-, or 180-degrees) may be sounded using the same coded time and/or frequency resources for reference signals when different groups of transmission beams are scrambled using different cell- and sector-specific scrambling codes.

The transmission beams in every active sector are either time division multiplexed or code division multiplexed. Every sector and/or every TP uses a different mapping of time or code to angular beam so that if a UE is able to receive transmission beams from different TPs, the UE is able to distinguish the TPs in the time, frequency, or code domains. Scrambling codes may be used with reference signals.

The multiplexing rules may be used in determining the beamformed reference signal and/or control signal configuration independent of the manner (i.e., static manner, semi-static manner, or dynamic manner) used.

According to an example embodiment, the determination of the beamformed reference and/or control signal configuration includes multiplexing the beamformed reference and/or control signals in the spatial and time or frequency domains. The multiplexing of the beamformed reference and/or control signals may be based on multiplexing rules (such as those discussed above).

Figure 6C:
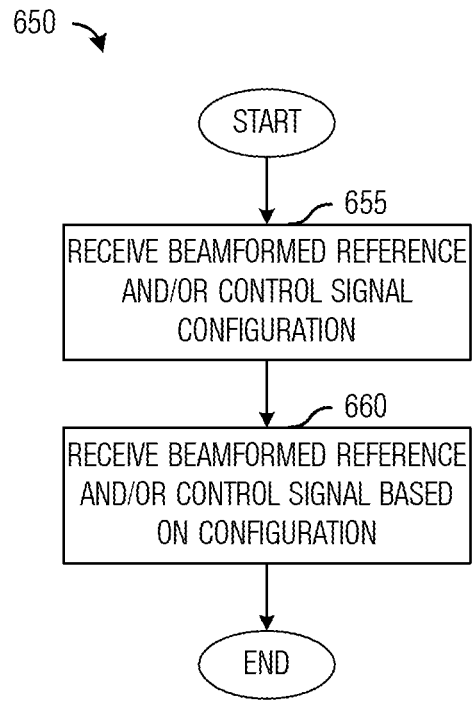
FIG. 6C illustrates a flow diagram of example operations occurring at a UE that is receiving multiplexed beamformed cell-specific reference and/or control signals according to example embodiments described herein.

FIG. 6C illustrates a flow diagram of example operations 650 occurring at a UE that is receiving multiplexed beamformed cell-specific reference and/or control signals. Operations 650 may be indicative of operations occurring in a UE as the UE receives multiplexed beamformed cell-specific reference and/or control signals.

Operations 650 may begin with the UE receiving beamformed reference and/or control signal configuration (block 655). The beamformed reference and/or control signal configuration may be received from a serving TP, a network entity performing adjustments to the beamformed reference and/or control signal configuration, a database, and so on. The beamformed reference and/or control signal configuration includes information about multiplexing in the spatial and time or frequency domains of beamformed reference and/or control signals. The UE may receive the entire beamformed reference and/or control signal configuration or the UE may receive only the portions of the beamformed reference and/or control signal configuration relevant to the UE. The UE receives beamformed reference and/or control signals based on the beamformed reference and/or control signal configuration (block 660).

According to an example embodiment, for a homogeneous communications system, the multiplexing of the beamformed reference and/or control signal occurs at TP coverage area edge boundaries and is in synchrony with neighboring TPs. The multiplexing occurs in the spatial domain for both digital and analog (i.e., radio frequency (RF)) beamforming, while multiplexing in the time and frequency domain occurs for digital beamforming and only in the time domain for analog beamforming. In such a multiplexing scheme, TP coverage area edge boundaries are sounded by a single TP at a single time instance or frequency band.

Figure 7A:
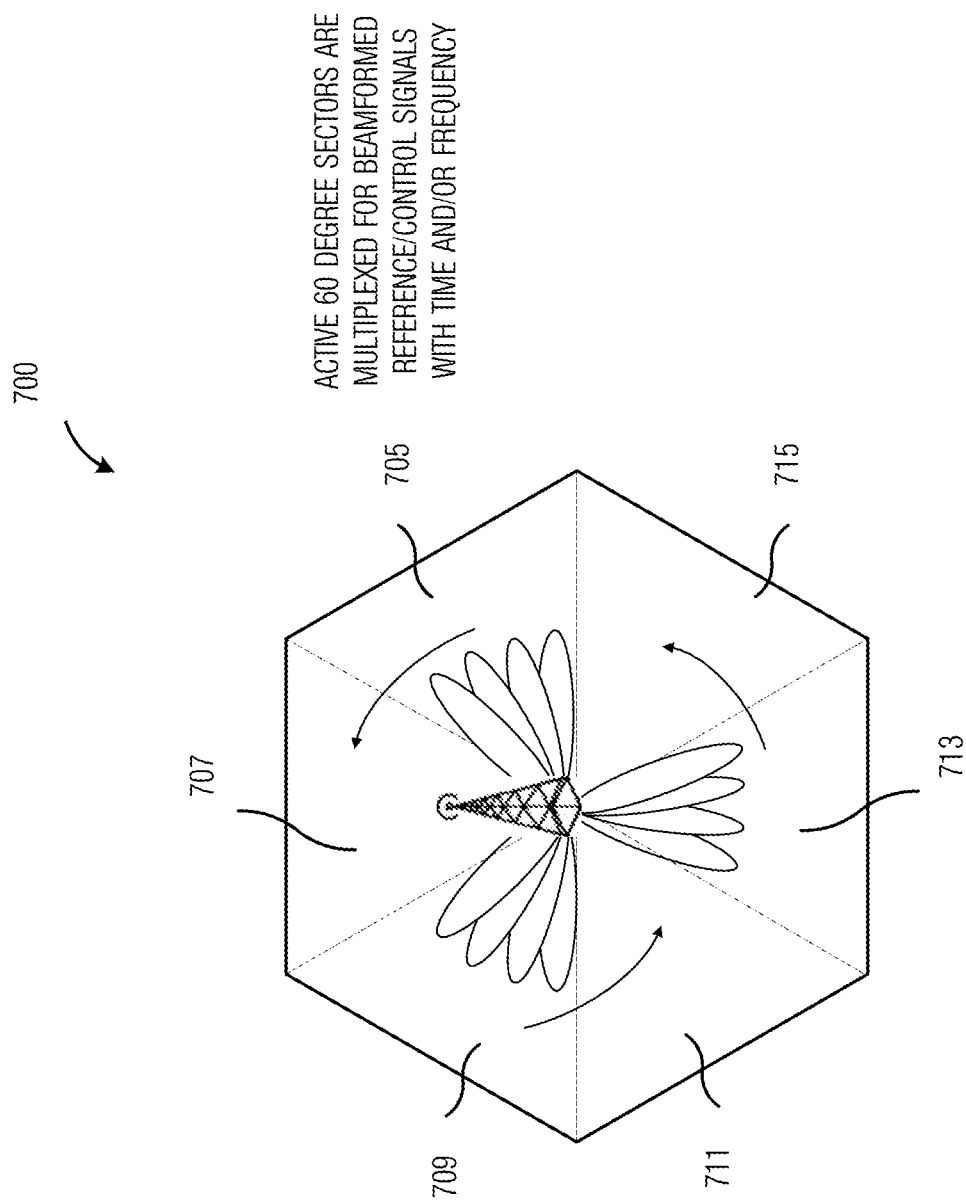
FIG. 7A illustrates an example coverage area of a TP according to example embodiments described herein.

FIG. 7A illustrates an example coverage area 700 of TP. The TP has a coverage area 700 partitioned into six 60 degree sectors. The 60 degree sectors are multiplexed for the beamformed reference and/or control signals in the time and/or frequency domains. As an illustrative example, in a first time instance and/or frequency band, beamformed reference and/or control signals are transmitted in 60 degree sectors 705, 709, and 713. Subsequently, in a second time instance and/or frequency band, beamformed reference and/or control signals are transmitted in 60 degree sectors 707, 711, and 715.

Figure 7B:
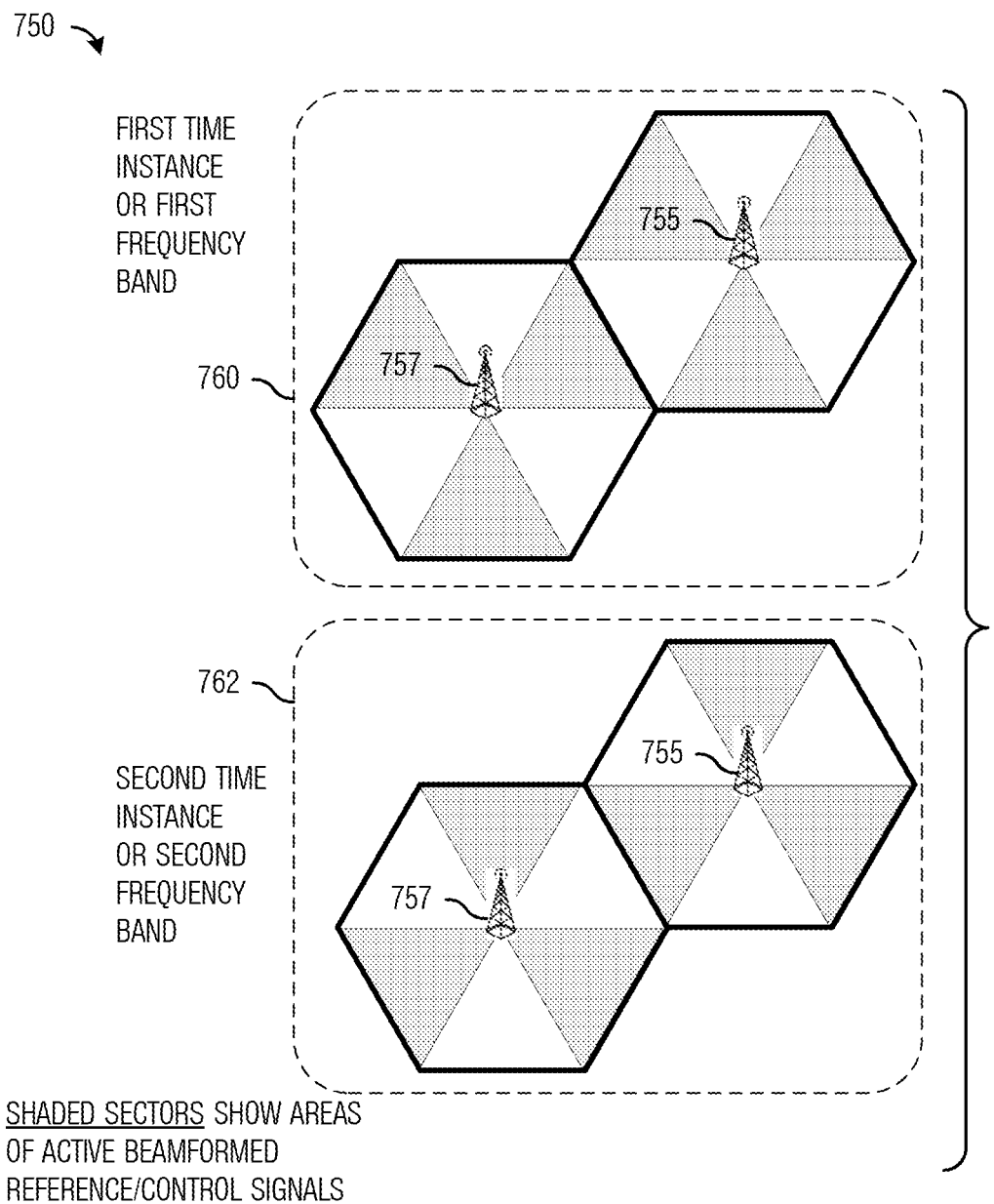
FIG. 7B illustrates a diagram of example adjacent TPs and their respective coverage areas according to example embodiments described herein.

FIG. 7B illustrates a diagram 750 of example adjacent TPs and their respective coverage areas. The shaded sectors indicate sectors with active beamformed reference and/or control signal transmission. As shown in FIG. 7B, TP 755 and TP 757 have adjusted their beamformed reference and/or control signal configuration so that a coverage area edge boundary common to the two TPs are sounded by only one TP at one time instance or frequency band. In a first highlight 760 representing the multiplexed transmission of the TPs in a first time instance or frequency band, the coverage area edge boundary common to the two TPs is sounded by TP 757, while in a second highlight representing the multiplexed transmission of the TPs in a second time instance or frequency band, the coverage area edge boundary common to the two TPs is sounded by TP 755.

Figure 8:
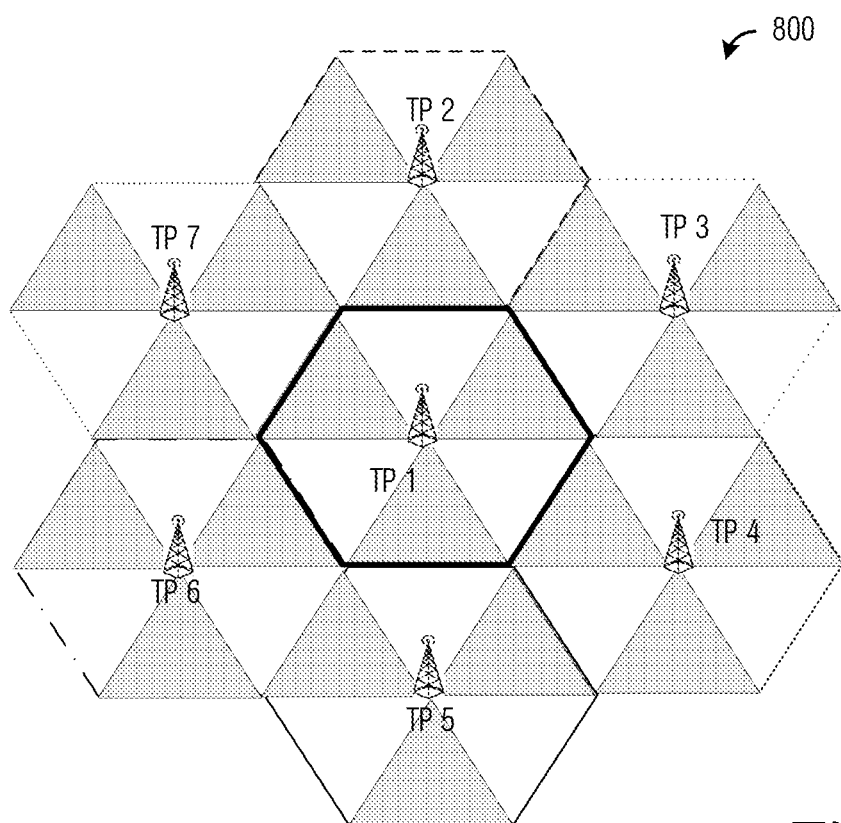
FIG. 8 illustrates an example beamformed reference and/or control signal configuration for a homogeneous communications system, where individual TPs have their respective coverage areas partitioned into six 60 degree sectors according to example embodiments described herein.

FIG. 8 illustrates an example beamformed reference and/or control signal configuration 800 for a homogeneous communications system, where individual TPs have their respective coverage areas partitioned into six 60 degree sectors. The beamformed reference and/or control signal configuration comprises alternating sectors of a TP being active or inactive at a given time instance or frequency band. In a first time instance or frequency band, every other sector is active (or inactive) and then in a second time instance or frequency band, the same every other sector is inactive (or active). Such a configuration allows coverage area edge boundaries of adjacent TPs to be sounded by only one TP at one time instance or frequency band. The transmission beams within a single active sector may use either code division multiplexing (CDM) or time division multiplexing (TDM). The mapping of code words to beam indices for CDM (or time slots to beam indices for TDM) may be altered for each active sector so that there is no possible transmission beam interference for UEs that are located at the corners of the coverage areas of the TPs.

Figure 9:
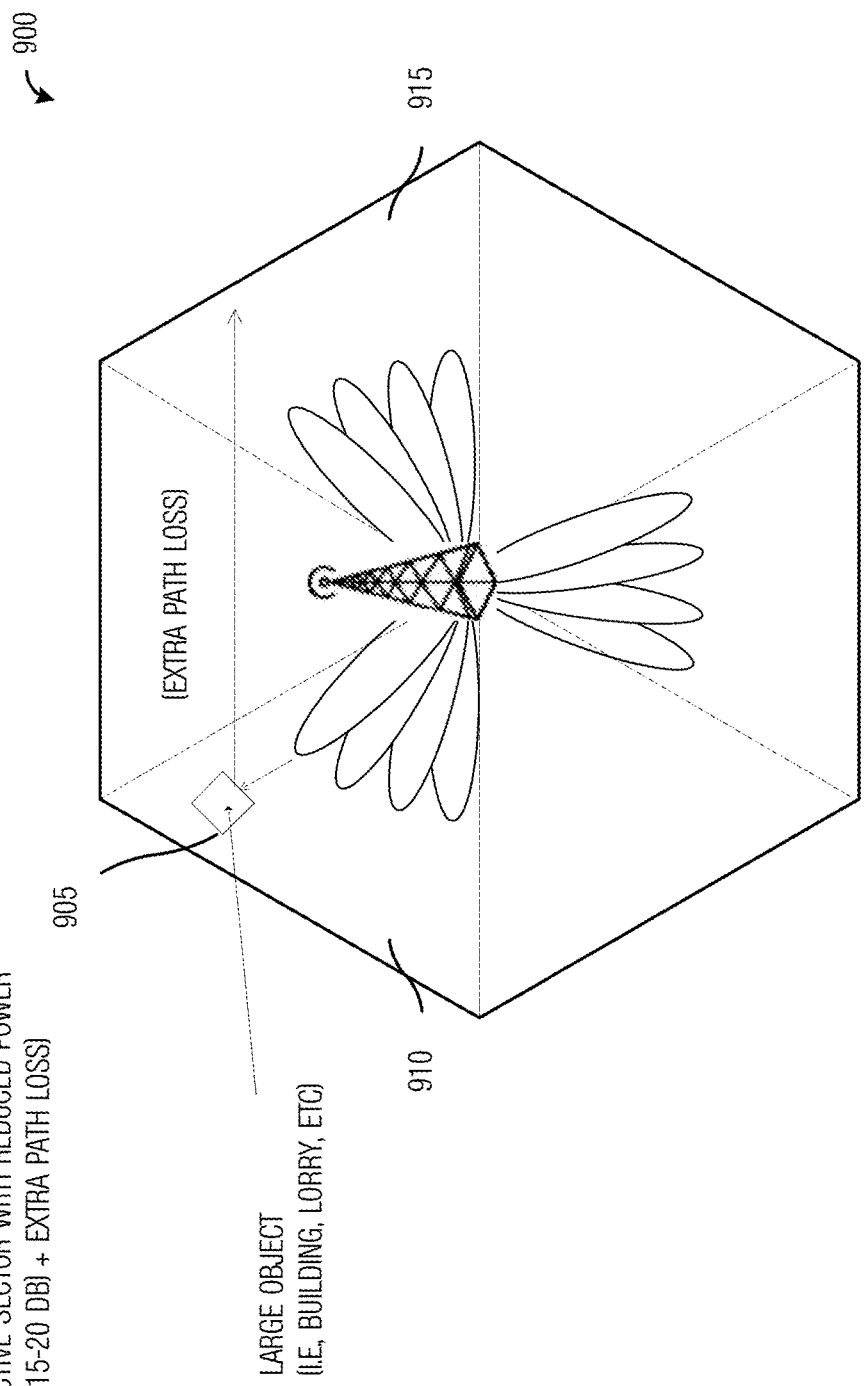
FIG. 9 illustrates an example coverage area served by a TP where a large object is located in the coverage area according to example embodiments described herein.

FIG. 9 illustrates an example coverage area 900 served by a TP where a large object 905 is located in coverage area 900. Signals transmitted within an active sector may be received at a reduced power level in another active sector. As shown in FIG. 9, large object 905 may cause reflections, leading to a signal transmitted in sector 910 being reflected into sector 915. At mmWave frequencies, the expected reflection loss may be generally in the 15-20 dB range, with the exact loss being dependent on the material and the frequency of the signals.

According to an example embodiment, different methods are used to multiplex the beamformed reference signals and beamformed control signals. For beamformed reference signals, a sector-specific scrambling code is used to scramble CDM resources of each sector. The sector-scrambling code may be used in a way that is similar to how a virtual cell ID is used for scrambling 3GPP LTE reference signals. With the use of the sector-specific scrambling code, the CDM resources of each active sector may be reused with different scrambling codes or the same scrambling code with different offsets. In such a situation, the communications overhead may be kept to a minimum and any possible low non-line of sight (NLOS) interference as previously described between active sectors of a TP is randomized.

Figure 10:
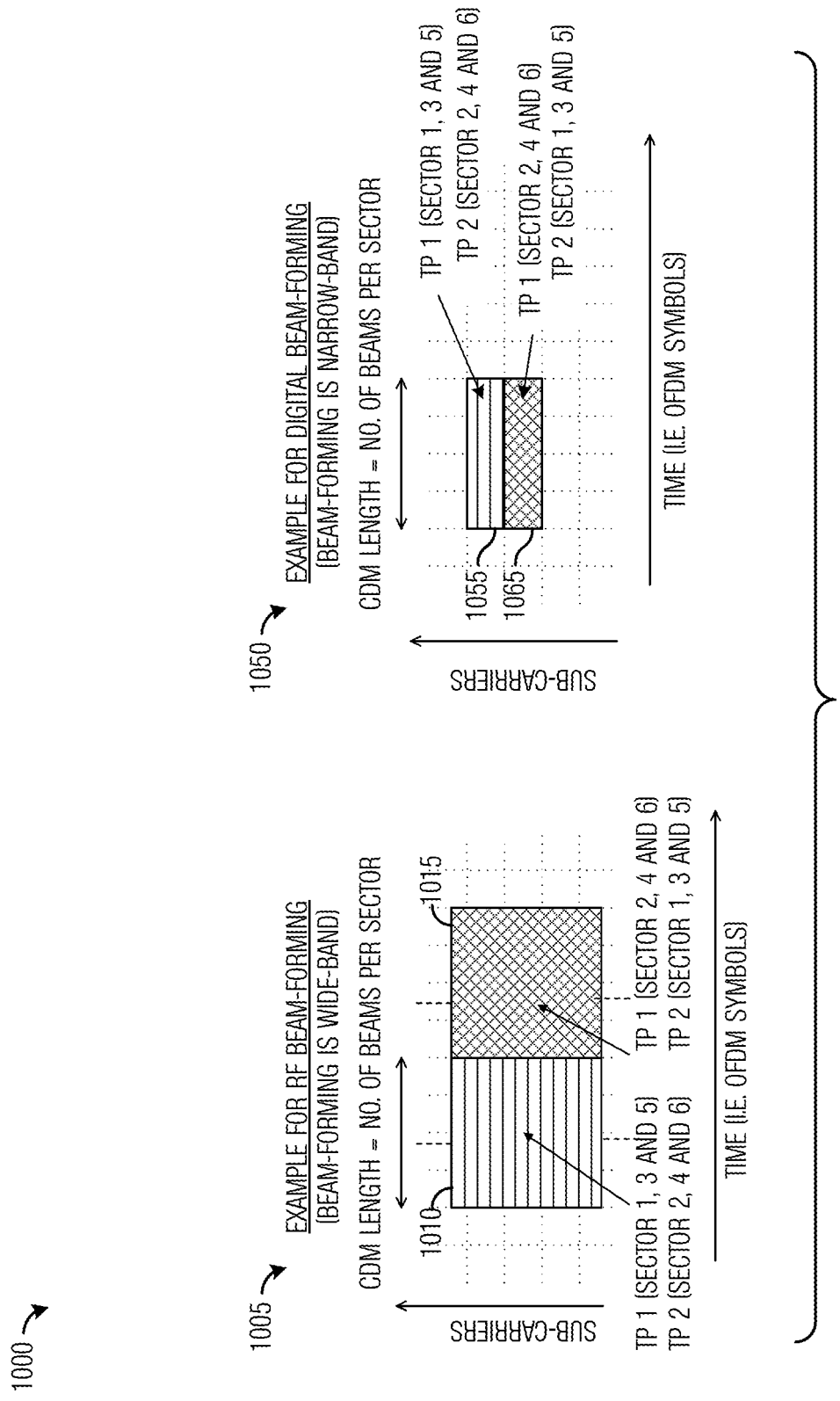
FIG. 10 illustrates time-frequency diagrams of example communications system resources where sector-specific scrambling codes are used to scramble beamformed reference signals according to example embodiments described herein.

FIG. 10 illustrates time-frequency diagrams 1000 of example communications system resources where sector-specific scrambling codes are used to scramble beamformed reference signals. First communications system resources 1005 illustrate wide-band beamforming of reference signals, where in a first time instance 1010, a subset of available frequency bands (potentially, the entirety of the available frequency bands) is used to transmit beamformed reference signals for sectors 1, 3, and 5 of TP1 and sectors 2, 4, and 6 of TP2, and in a second time instance 1015, the subset of available frequency bands are used to transmit beamformed reference signals for sectors 1, 3, and 5 of TP2 and sectors 2, 4, and 6 of TP1. The beamformed reference signals of TP1 and TP2 are scrambled by their respective sector-specific scrambling codes, so the communications system resources are shared. The beamforming may be achieved using either digital or RF beamforming.

Second communications system resources 1050 illustrate narrow-band beamforming of reference signals, where in a first frequency band 1055, a subset of available time instances is used to transmit beamformed reference signals for sectors 1, 3, and 5 of TP1 and sectors 2, 4, and 6 of TP2, and in a second frequency band 1065, the subset of available time instances are used to transmit beamformed reference signals for sectors 1, 3, and 5 of TP2 and sectors 2, 4, and 6 of TP1. The beamformed reference signals of TP1 and TP2 are scrambled by their respective sector-specific scrambling codes, so the communications system resources are shared. Since the beamforming is narrowband, the beamforming may be performed using digital beamforming techniques.

Figure 11:
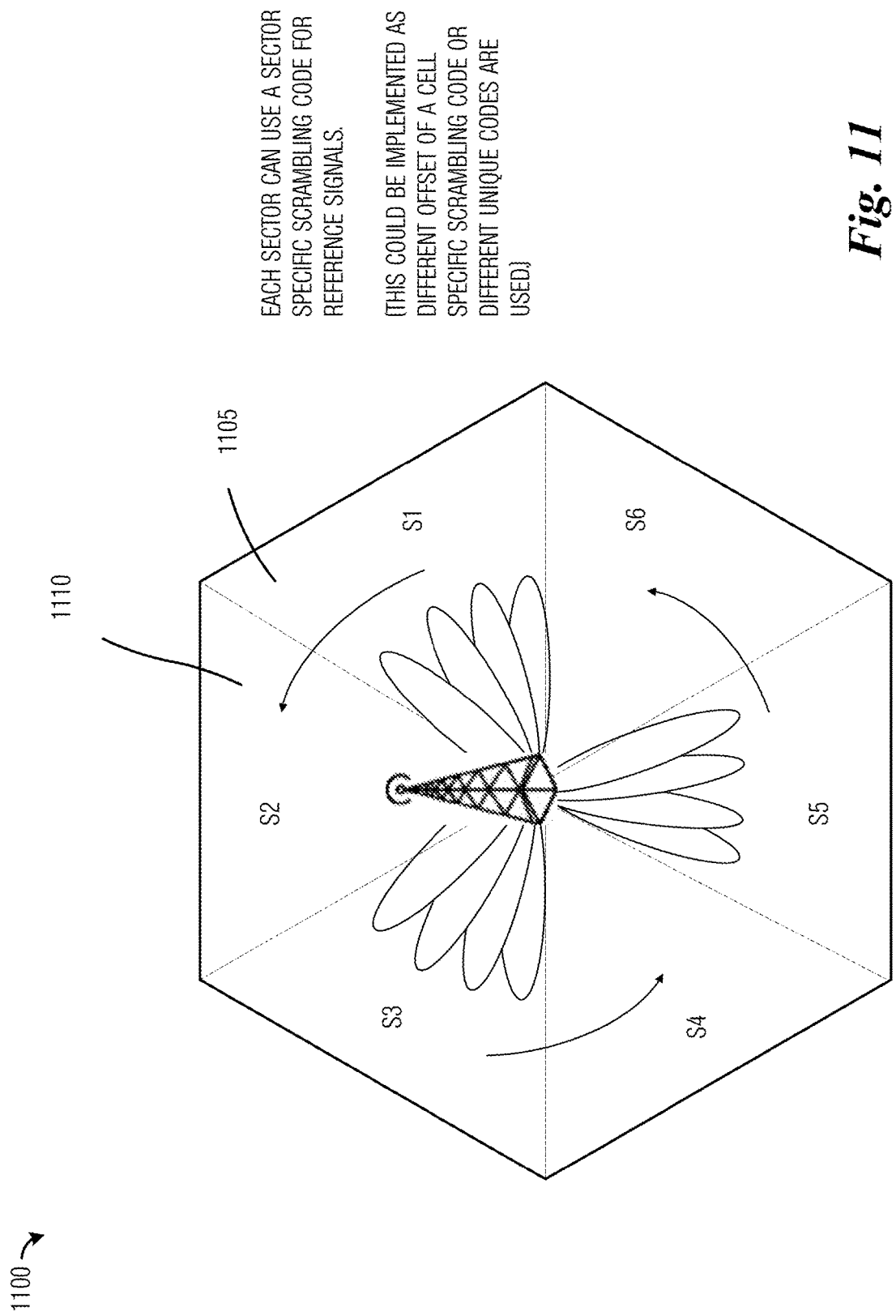
FIG. 11 illustrates an example coverage area of a TP where sector-specific scrambling codes are used to scramble beamformed reference signals according to example embodiments described herein.

FIG. 11 illustrates an example coverage area 1100 of a TP where sector-specific scrambling codes are used to scramble beamformed reference signals. Each sector, such as sector 1105 and sector 1110, of coverage area 1100 may use different sector-specific scrambling codes to scramble the beamformed reference signals transmitted by the sector. The different sector-specific scrambling codes may be implemented as different offsets of a cell-specific scrambling code for each sector. Alternatively, each sector may use its own unique scrambling code. As shown in FIG. 11, the TP transmits a total of 24 different beamformed reference signals. In sector 1105 (and every second sector from sector 1105 as well), the TP transmits 4 beamformed reference signals associated with the sector in a first time instance and in sector 1110 (and every second sector from sector 1110 as well), the TP transmits 4 beamformed reference signals associated with the sector in a second time instance.

According to an example embodiment, each active beamformed reference signal is associated with a unique orthogonal code instead of using a sector-specific scrambling code In the previous example discussed above, the use of unique orthogonal codes instead of sector-specific scrambling codes means that 3 times the number of CDM resources is needed.

Unlike beamformed reference signals, sector-specific scrambling codes cannot be used on control signals. Beamformed control signals require a different communications system resource for each active beamformed control signal, for each active beam on the control signal. As an example, considering the example communications system discussed herein, at least 24 communications system resources are needed for the beamformed BCCH signal for each cell. However, only 12 communications system resources (i.e. requiring 12 orthogonal resources) are sounded at any given time instance and this would need 3 times the number of sounding resources compared to the same beam-formed reference signal with sector specific scrambling. The use of different communications system resources for each active beamformed control signal in a cell eliminates any ambiguity between sectors in each cell and each UE can clearly determine which cell and sectors yield the best connection, even in NLOS situations.

Once a UE knows which cell and sectors to use to form the best connections (from the beam-formed control signal (i.e., BCCH)), the UE may be explicitly informed (from sector broadcast information, for example) or implicitly informed (from the chosen cell and sectors) regarding which scrambling codes are used for the beamformed reference signals (in the situation where sector- and cell-specific scrambling codes are used to scramble beamformed reference signals). It is noted that in some mmWave communications system deployments (e.g., when a small mmWave communications system is contained within a legacy macro communications system, or when there are dense deployments of TPs) it may not be necessary for every mmWave TP to transmit beamformed control signals and the control plane and the data plane may be split, however it will be necessary for each TP to transmit beamformed reference signals.

Figure 12:
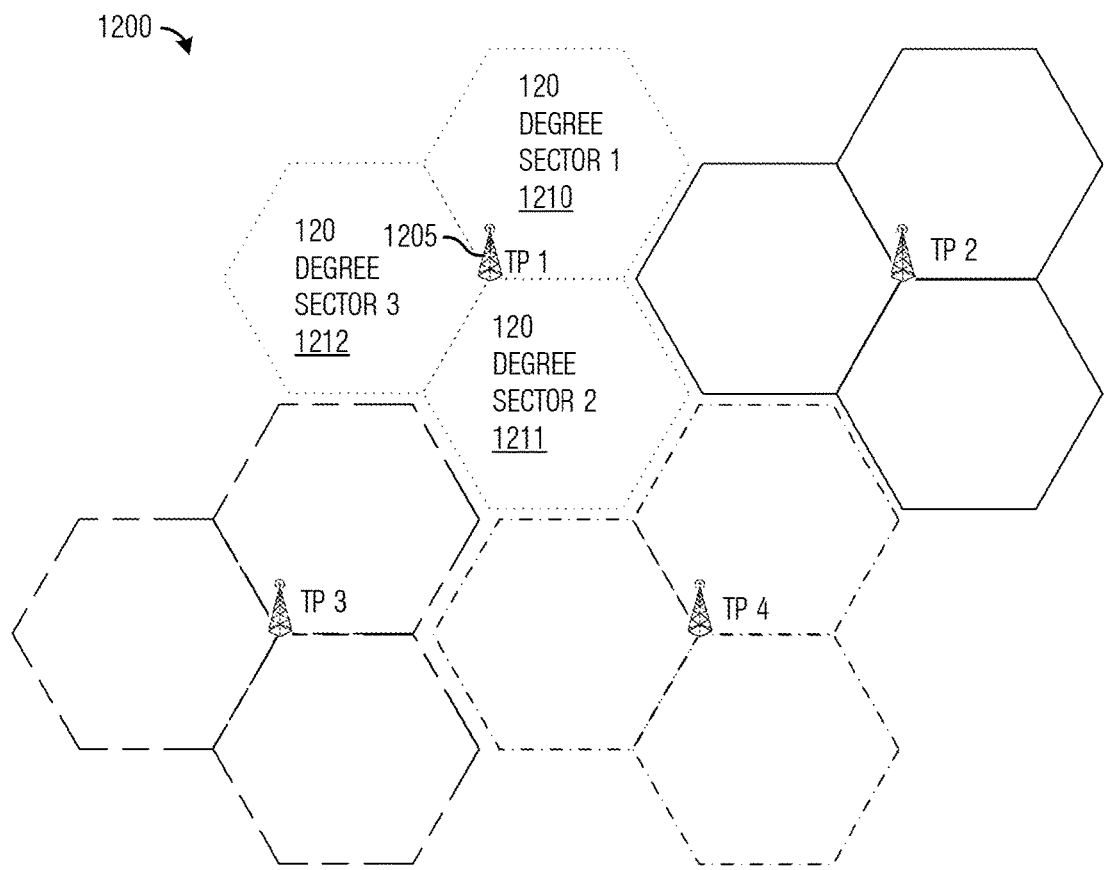
FIG. 12 illustrates an example communications system where each TP is in the center of three hexagonal sectors according to example embodiments described herein.

The example embodiments presented herein are operable for any cell coverage area shape. FIG. 12 illustrates an example communications system 1200 where each TP is in the center of three hexagonal sectors. The TPs in communications system 1200 serve three 120 degree sectors. As an example, TP 1 1205 serves 120 degree sector 1 1210, 120 degree sector 2 1211, and 120 degree sector 3 1212. Due to the use of directional antennas in each 120 degree sector, the coverage area of each TP is no longer a hexagon but has 12 edges.

Figure 13A:
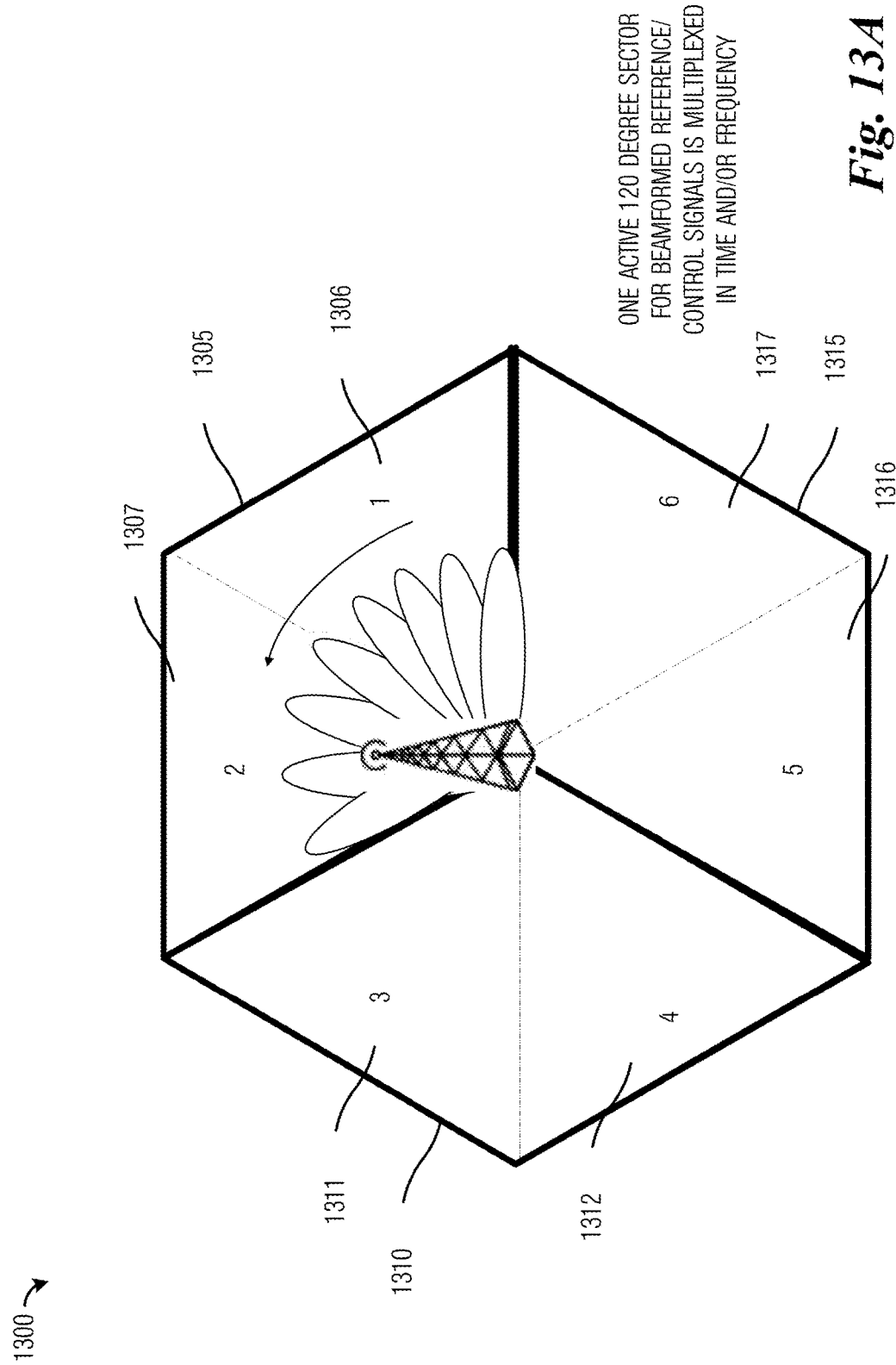
FIG. 13A illustrates an example TP coverage area that is part of communications system of FIG. 12 according to example embodiments described herein.

FIG. 13A illustrates an example TP coverage area 1300 that is part of communications system 1200. TP coverage area 1300 has three 120 degree sectors that is a combination of two 60 degree sectors, such as 120 degree sector 1305 (a combination of 60 degree sectors 1306 and 1307, 120 degree sector 1310 (a combination of 60 degree sectors 1311 and 1312), and 120 degree sector 1315 (a combination of 60 degree sectors 1316 and 1317). TP 1300 transmits beamformed reference and/or control signals in an active 120 degree sector, while the other two 120 degree sectors, such as 120 degree sectors 1310 and 1315, are inactive. The beamformed reference and/or control signals are multiplexed in the spatial domain and in the time domain and/or the frequency domain.

Figure 13B:
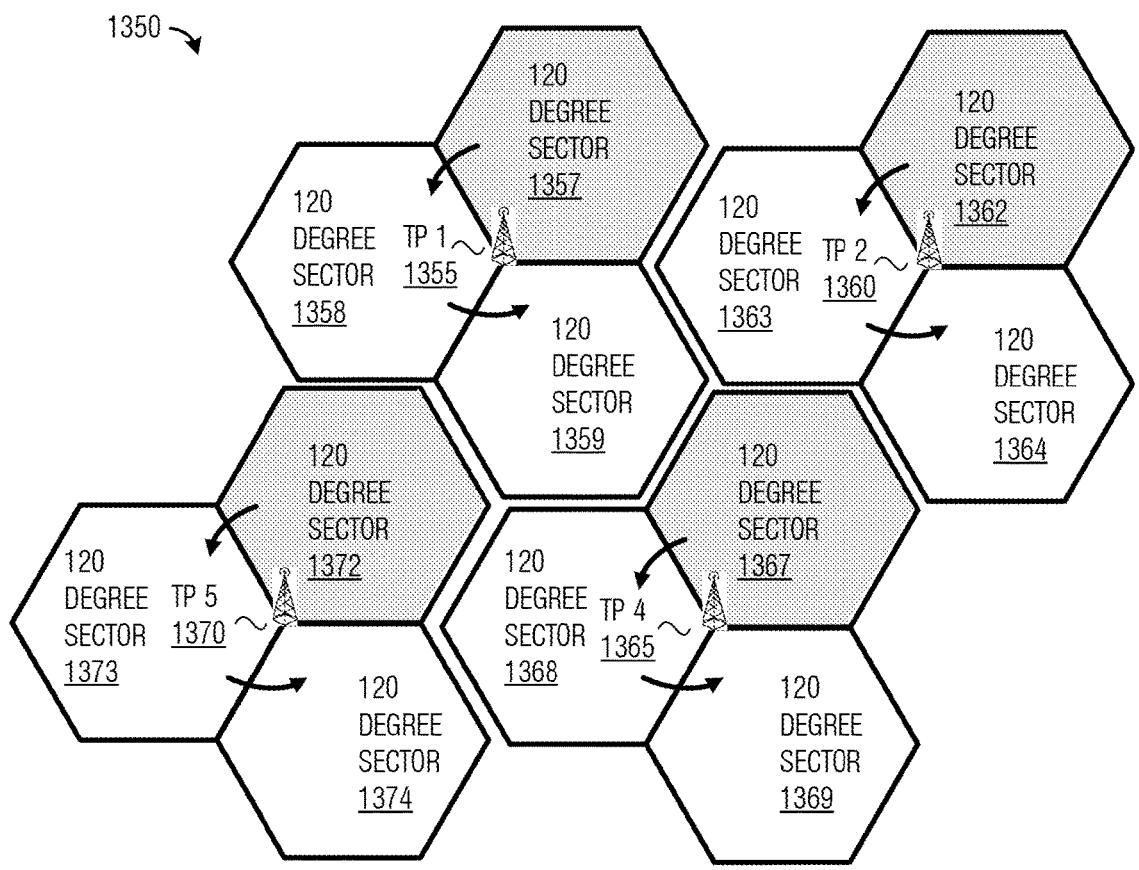
FIG. 13B illustrates an example communications system where the TPs are located at the center of three hexagonal sectors according to example embodiments described herein.

FIG. 13B illustrates an example communications system 1350 where the TPs are located at the center of three hexagonal sectors (which is the same as communications system 1200 of FIG. 12, but now active sectors are highlighted). Communications system 1350 includes a plurality of TPs, such as TP 1355, 1360, 1365, and 1370. The TPs multiplex beamformed reference and/or control signals to reduce resource communications overhead and interference to UEs. At a first time instance or frequency band, the TPs transmit beamformed reference and/or control signals in active sectors, such as 120 degree sectors 1357, 1362, 1367, and 1372, while inactive sectors remain silent. At a second time instance or frequency band, the previously active sectors (i.e., 120 degree sectors 1357, 1362, 1367, and 1372) become inactive and a first subset of the previously inactive sectors (e.g., 120 degree sectors 1358, 1363, 1368, and 1373) become active and the TPs transmit beamformed reference and/or control signals in the first subset of the previously inactive sectors. At a third time instance or frequency band, the sectors in the first subset of sectors become inactive and a second subset of previously inactive sectors (e.g., 120 degree sectors 1359, 1364, 1369, and 1374) become active and the TPs transmit beamformed reference and/or control signals in the second subset of the previously inactive sectors.

According to an example embodiment, for a communications system with TPs having overlapping coverage areas or a communications system supporting distributed multipoint transmission, the beamformed reference and/or control signals are multiplexed from each TP per overlapping coverage area in synchrony with neighboring TPs. The multiplexing may be performed in the time domain using digital and/or RF beamforming and/or in the frequency domain using digital beamforming.

Figure 14:
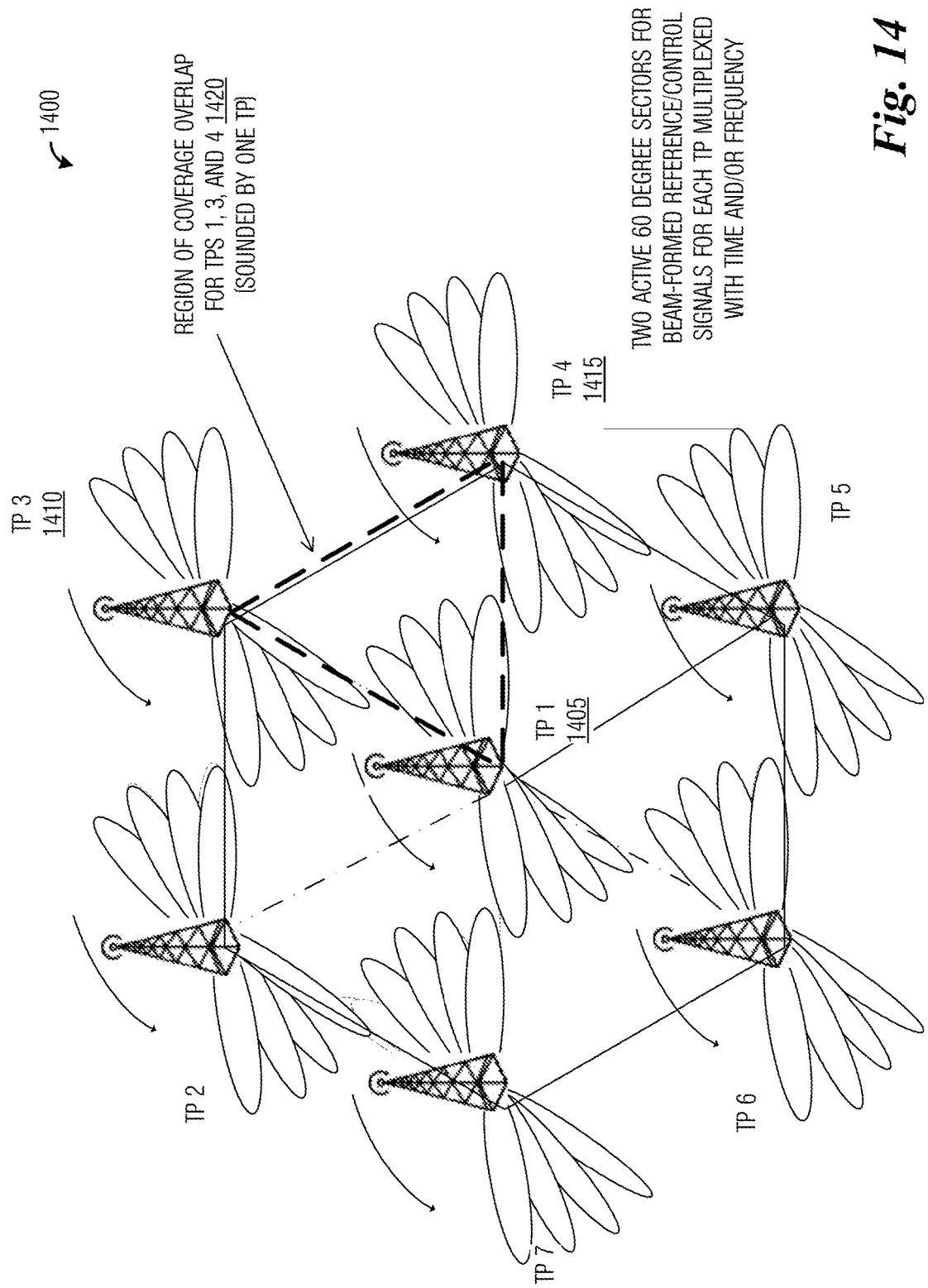
FIG. 14 illustrates an example communications system where TPs have overlapping coverage areas according to example embodiments described herein.

FIG. 14 illustrates an example communications system 1400 where TPs have overlapping coverage areas. Communications system 1400 includes a plurality of TPs sharing a region of coverage overlap, such as TP1 1405, TP3 1410, and TP4 1415 sharing region of coverage overlap 1420. Within a region of coverage overlap, such as region of coverage overlap 1420, a single TP may sound the beamformed reference and/or control signals for the plurality of TPs sharing the region of coverage overlap. As shown in FIG. 14, TP1 1405 sounds the beamformed reference and/or control signals for TP3 1410 and TP4 1415. The TP sounding the beamformed reference and/or control signals may sound in opposite sectors. As an illustrative example, the beamformed reference and/or control signals are sounded in opposite 60 degree sectors at one time instance or one frequency band from each TP. As shown in FIG. 14, TP1 1405 may sound in a first time instance or frequency band for region of coverage overlap 1420, TP3 1410 may sound in a second time instance or frequency band for region of coverage overlap 1420, and TP4 1415 may sound in a third time instance or frequency band for region of coverage overlap 1420.

According to an example embodiment, for a communications system with TPs having overlapping coverage areas or a communications system supporting distributed multipoint transmission, beamformed reference signals are scrambled using sector-specific and (optionally) cell-specific) scrambling codes. The use of scrambling codes enables the reuse of CDM resources by the same different TPs in different active sectors with different scrambling codes.

Figure 15:
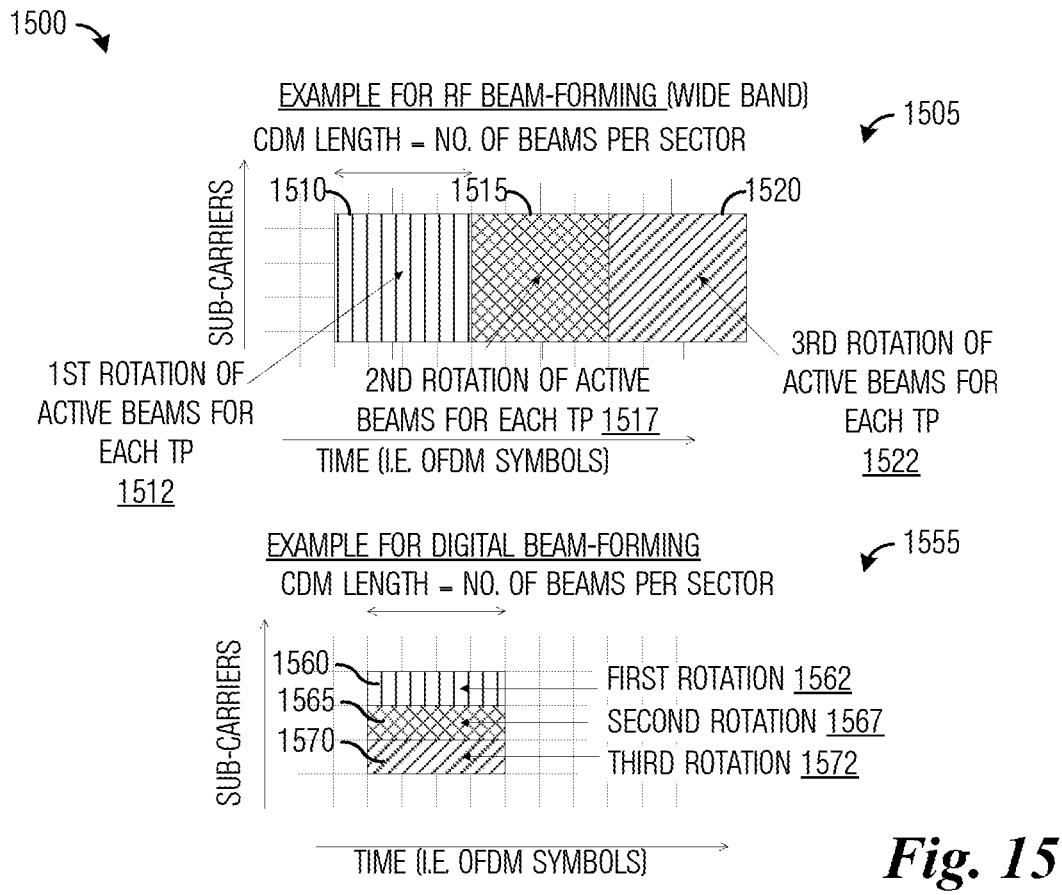
FIG. 15 illustrate time-frequency diagrams of example communications system resources where sector-specific scrambling codes are used to scramble beamformed reference signals in a communications system with TPs having overlapping coverage areas or a communications system supporting distributed multipoint transmission according to example embodiments described herein.

FIG. 15 illustrate time-frequency diagrams 1500 of example communications system resources where sector-specific scrambling codes are used to scramble beamformed reference signals in a communications system with TPs having overlapping coverage areas or a communications system supporting distributed multipoint transmission. First communications system resources 1505 illustrate wide-band beamforming of reference signals, where in a first time instance 1510, a first rotation of beamformed reference signals are transmitted in a first set of active sectors of each TP 1512; in a second time instance 1515, a second rotation of beamformed reference signals are transmitted in a second set of active sectors of each TP 1517; and in a third time instance 1520, a third rotation of beamformed reference signals are transmitted in a third set of active sectors of each TP 1522. The beamforming may be achieved using either digital or RF beamforming.

Second communications system resources 1555 illustrate narrow-band beamforming of reference signals, wherein in a first frequency band 1560, a first rotation of beamformed reference signals are transmitted in a first set of active sectors; in a second frequency band 1565, a second rotation of beamformed reference signals are transmitted in a second set of active sectors; and in a third frequency band 1570, a third rotation of beamformed reference signals are transmitted in a third set of active sectors. The beamforming may be achieved using digital beamforming.

Figure 16A:
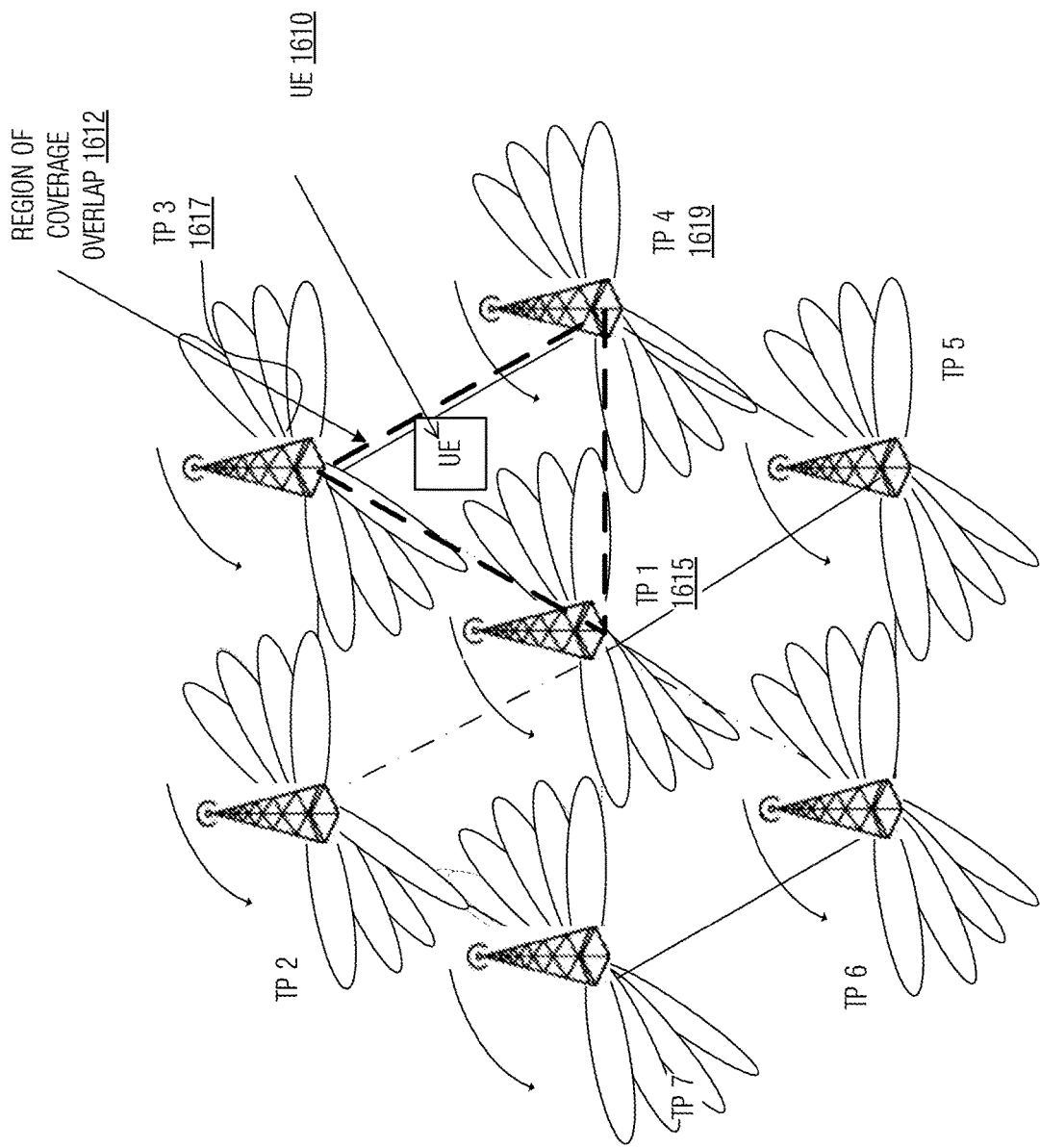
FIG. 16A illustrates an example communications system highlighting signals received by a UE when TPs have overlapping coverage areas according to example embodiments described herein.

FIG. 16A illustrates an example communications system 1600 highlighting signals received by a UE when TPs have overlapping coverage areas. As shown in FIG. 16A, a UE 1610 is located in a region of coverage overlap 1612. Region of coverage overlap 1612 is served by TP1 1615, TP3 1617, and TP4 1619. At different time instances or different frequency bands, UE 1610 may receive beamformed reference signals from different TPs (i.e., TP1 1615, TP3 1617, and TP4 1619).

Figure 16B:
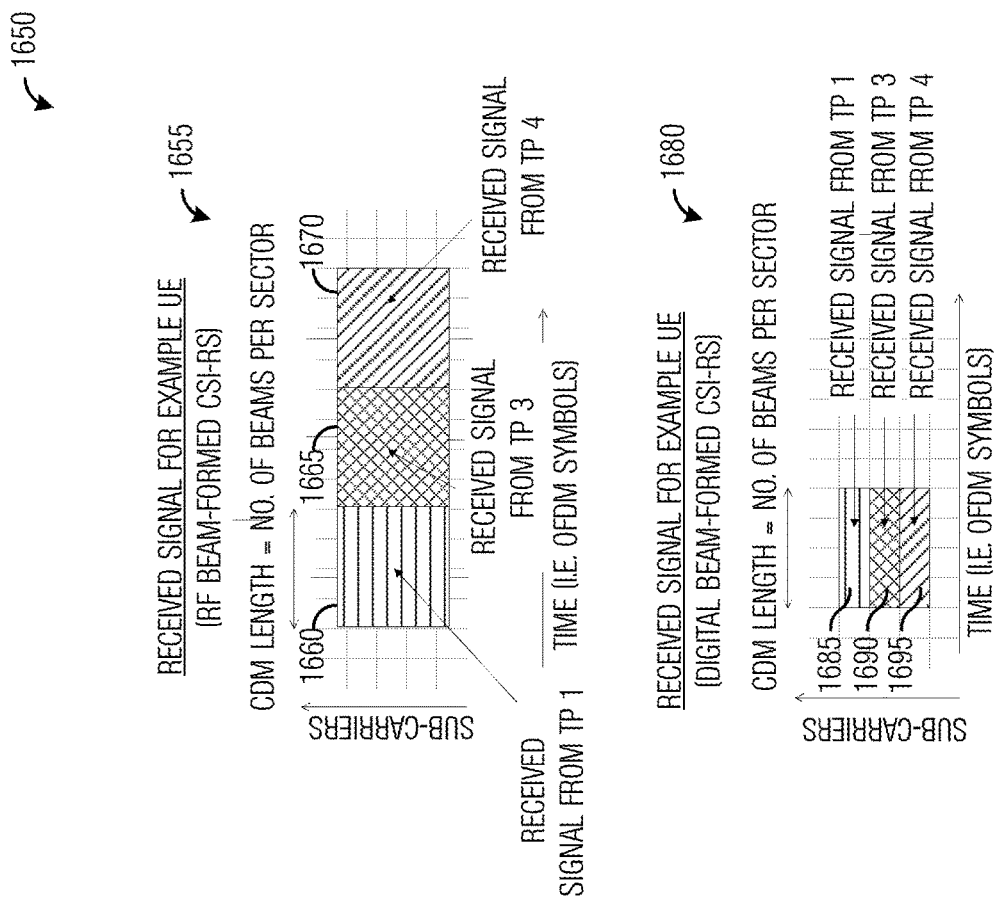
FIG. 16B illustrate time-frequency diagrams of example communications system resources highlighting signals received by a UE according to example embodiments described herein.

FIG. 16B illustrate time-frequency diagrams 1650 of example communications system resources highlighting signals received by a UE. First communications system resources 1655 illustrate received signals corresponding to digital or RF beamformed reference signals. At a first time instance 1660, UE 1610 receives signals sounded by TP1 1615, at a second time instance 1665, UE 1610 receives signals sounded by TP3 1617, and at a third time instance 1670, UE 1610 receives signals sounded by TP4 1619. Second communications system resources 1680 illustrate received signals corresponding to digital beamformed reference signals. At a first frequency band 1685, UE 1610 receives signals sounded by TP1 1615, at a second frequency band 1690, UE 1610 receives signals sounded by TP3 1617, and at a third frequency band 1695, UE 1610 receives signals sounded by TP4 1619.

For HetNets, a variety of techniques, such as almost blanked subframes (ABS), are used to suppress interference from larger, high power TPs (i.e., macro cells) to smaller, low power TPs (i.e., pico cells) on data carrying REs. However, reference and/or control signals (e.g., common reference signal (CRS), PSS, SSS, and so on) are generally transmitted in high power cells at full power and may collide with corresponding reference and/or control signals in low power cells. According to an example embodiment, the proposed multiplexing of beamformed reference and/or control signals in the spatial domain and the time and/or frequency domains also helps reduce communications overhead and interference for HetNets.

One way to eliminate interference and help reduce communications overhead is to allocate to the low power TPs the same multiplexed resources that are also allocated to neighboring sectors of neighboring TPs (the multiplexing may occur in the time and/or frequency domains). However, the low power TPs may have more beam directions to signal than the neighboring sectors of the neighboring TPs and therefore the low power TPs may need extra communications system resources to signal all beam directions. The same differences present in the handling of beamformed reference signals and beamformed control signals in a homogeneous communications system exist in HetNets. The discussion presented below focuses on beamformed reference signals, but may also be applied to beamformed control signals.

According to an example embodiment, for a HetNet, a low power TP sounds beamformed reference and/or control signals only when a sector in which it is located is not active.

The low power TP sounds the beamformed reference and/or control signals in accordance with the example embodiments presented herein.

Figure 17A:
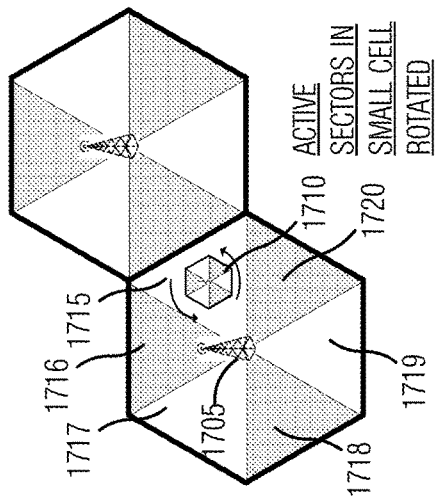
FIGS. 17A-17C illustrate a first example beamformed reference and/or control signal sounding technique in different time instances or frequency bands of a HetNet according to example embodiments described herein.
Figure 17B:
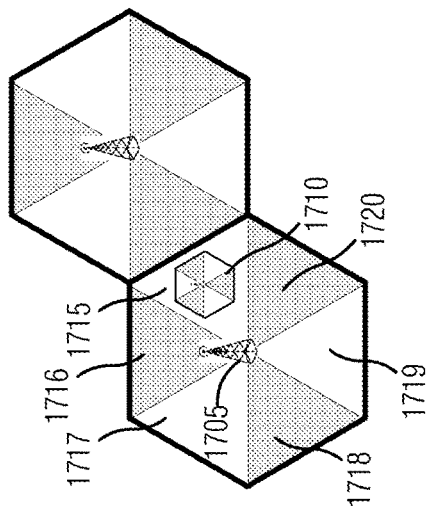
Figure 17C:
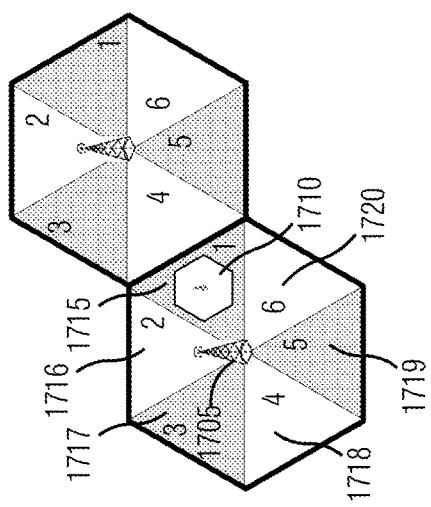

FIGS. 17A-17C illustrate a first example beamformed reference and/or control signal sounding technique in different time instances or frequency bands of a HetNet. During a first time instance or frequency band 1700, a TP 1705 is sounding beamformed reference and/or control signals in a sector 1715 which includes low power TP 1710. Therefore, to reduce interference, low power TP 1710 does not sound any beamformed reference and/or control signals. TP 1705 sounds its beamformed reference and/or control signals in accordance with the example embodiments presented herein, therefore, sectors 1715, 1717, and 1719 are active in the first time instance or frequency band while sectors 1716, 1718, and 1720 are inactive. Active and inactive sectors are illustrated by differences in shading.

During a second time instance or frequency band 1730, TP 1705 is not sounding beamformed reference and/or control signals in sector 1715 since TP 1705 has switched active and inactive sectors. Hence, low power TP 1710 is able to sound its own beamformed reference and/or control signals. Pico TP 1710 sounds its beamformed reference and/or control signals in accordance with the example embodiments presented herein. Therefore, some sectors of low power TP 1710 are active while other sectors of low power TP 1710 are inactive (active and inactive sectors are illustrated by differences in shading). In order to allow low power TP 1710 to sound all of its beamformed reference and/or control signals, a third time instance or frequency band 1760 (which may be a subset of a time instance or frequency band wherein TP 1705 is not sounding beamformed reference and/or control signals in sector 1715) is required. In third time instance or frequency band 1760 low power TP 1710 changes the sectors in which it is sounding its beamformed reference and/or control signals.

Figures 18A, 18B:
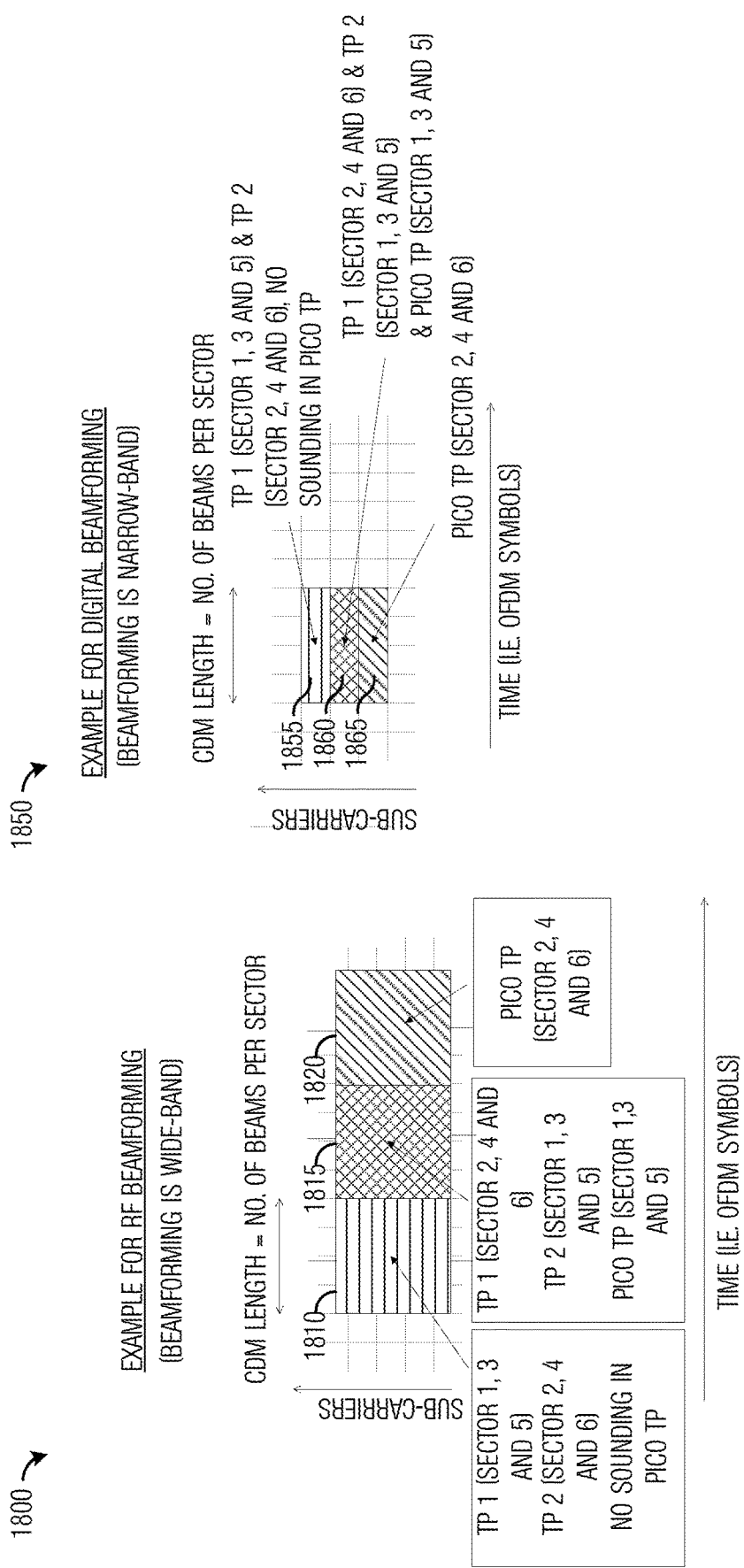
FIGS. 18A and 18B illustrate time-frequency diagrams of example communications system resources of a HetNet according to example embodiments described herein.

FIGS. 18A and 18B illustrate time-frequency diagrams of example communications system resources of a HetNet. In FIG. 18A, communications system resources 1800 illustrate wide-band beamforming of reference signals in a HetNet, where in a first time instance 1810, a first TP is sounding beamformed reference signals in sectors 1, 3, and 5, a second TP is sounding beamformed reference signals in sectors 2, 4, and 6, while a low power TP is not sounding at all. During a second time instance 1815, the first TP is sounding beamformed reference signals in sectors 2, 4, and 6, the second TP is sounding beamformed reference signals in sectors 1, 3, and 5, while the low power TP sounds beamformed reference signals in sectors 1, 3, and 5. During a third time instance 1820, the low power TP sounds beamformed reference signals in sectors 2, 4, and 6. Although it is not shown on FIG. 18A, during third time instance 1820 the first TP and second TP could also optionally re-sound on the same sectors as they did during the second time instance (namely sectors 2, 4 and 6 for the first TP and sectors 1, 3 and 5 for the second TP) if required. In FIG. 18B, communications system resources 1850 illustrate narrow-band beamforming of reference signals in a HetNet, where in a first frequency band 1855, a first TP is sounding beamformed reference signals in sectors 1, 3, and 5, a second TP is sounding beamformed reference signals in sectors 2, 4, and 6, while a low power TP is not sounding at all. In a second frequency band 1860, the first TP is sounding beamformed reference signals in sectors 2, 4, and 6, the second TP is sounding beamformed reference signals in sectors 1, 3, and 5, while the low power TP sounds beamformed reference signals in sectors 1, 3, and 5. In a third frequency band 1865, the low power TP sounds beamformed reference signals in sectors 2, 4, and 6. Although it is not shown on FIG. 18B, during third frequency band 1865 the first TP and second TP could also optionally re-sound on the same sectors as they did in the second frequency band (namely sectors 2, 4 and 6 for the first TP and sectors 1, 3 and 5 for the second TP) if required.

Figure 19A:
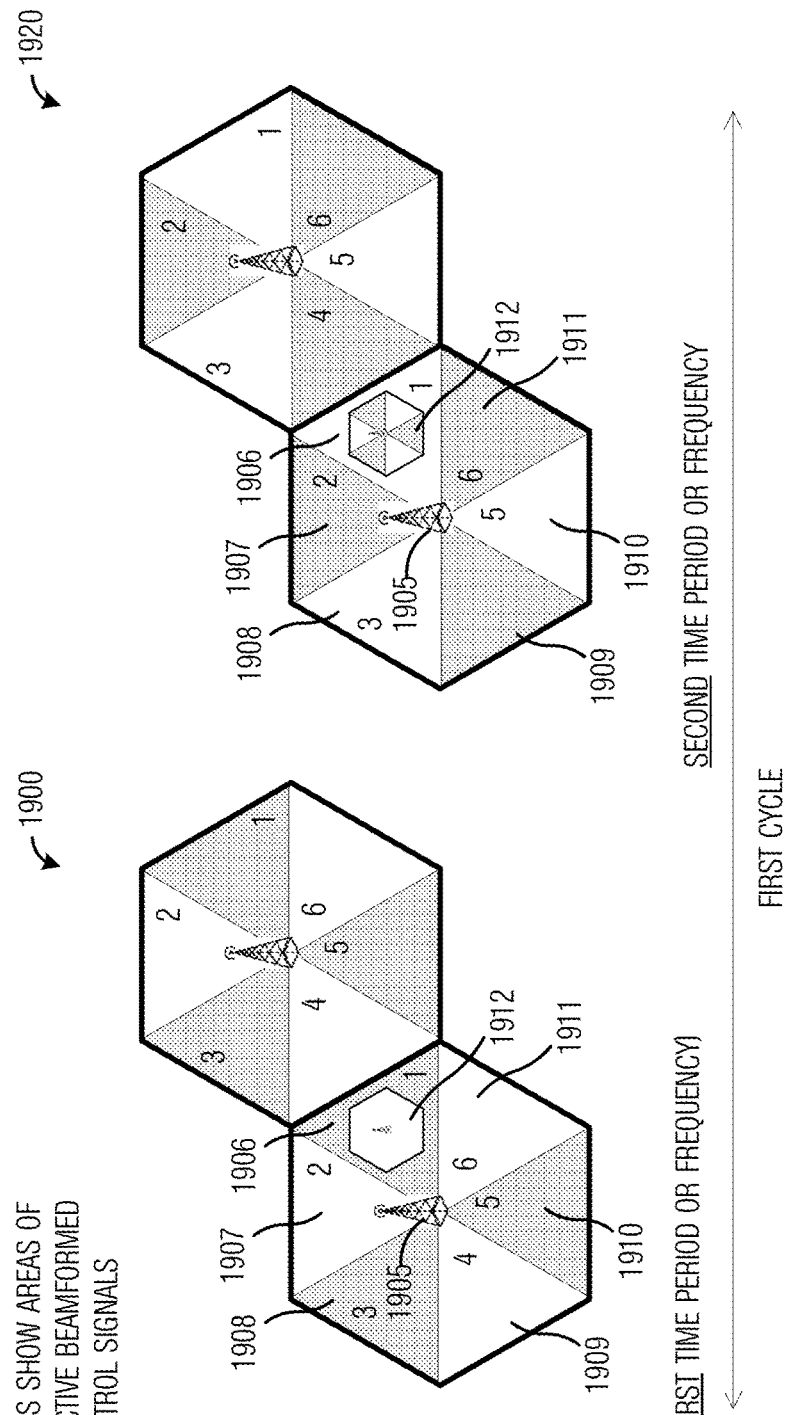
FIGS. 19A-19B illustrate a second example beamformed reference and/or control signal sounding technique in different time instances or frequency bands of a HetNet according to example embodiments described herein.
Figure 19B:
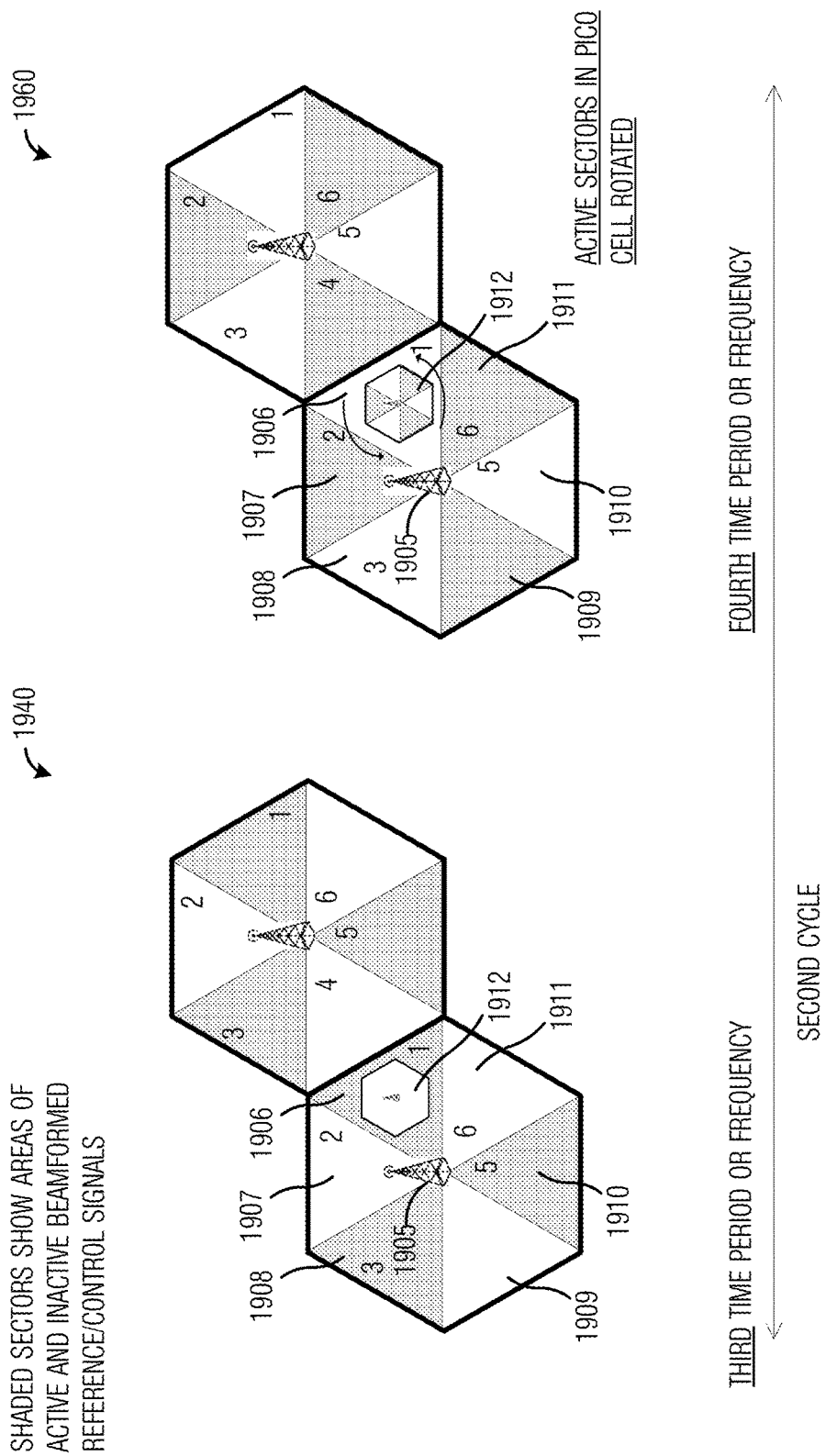

FIGS. 19A-19B illustrate a second example beamformed reference and/or control signal sounding technique in different time instances or frequency bands of a HetNet. In FIG. 19A, a first cycle of beamformed reference and/or control signals sounding is illustrated. During a first time instance or frequency band 1900, a TP 1905 sounds beamformed reference signals in sectors 1906, 1908, and 1910 while sectors 1907, 1909, and 1911 are inactive. A low power TP 1912, located in sector 1906 is not sounding since it is located in an active sector. During a second time instance or frequency band 1920, TP 1905 sounds beamformed reference signals in sectors 1907, 1909, and 1911 while sectors 1906, 1908, and 1910 are inactive. Pico TP 1912 is then able to sound beamformed reference signals in a subset of its sectors (active and inactive sectors are shown as either shaded or unshaded). In FIG. 19B, a second cycle of beamformed reference and/or control signals sounding is illustrated. During a third time instance or frequency band 1940, TP 1905 sounds beamformed reference signals in sectors 1906, 1908, and 1910 while sectors 1907, 1909, and 1911 are inactive. Pico TP 1912, located in sector 1906 is not sounding since it is located in an active sector. During a fourth time instance or frequency band 1960, TP 1905 sounds beamformed reference signals in sectors 1907, 1909, and 1911 while sectors 1906, 1908, and 1910 are inactive. Pico TP 1912 is then able to sound beamformed reference signals in a subset of its sectors that was inactive during second time instance or frequency band 1920. In other words, low power TP 1912 has rotated its active and inactive sectors.

Figure 20:
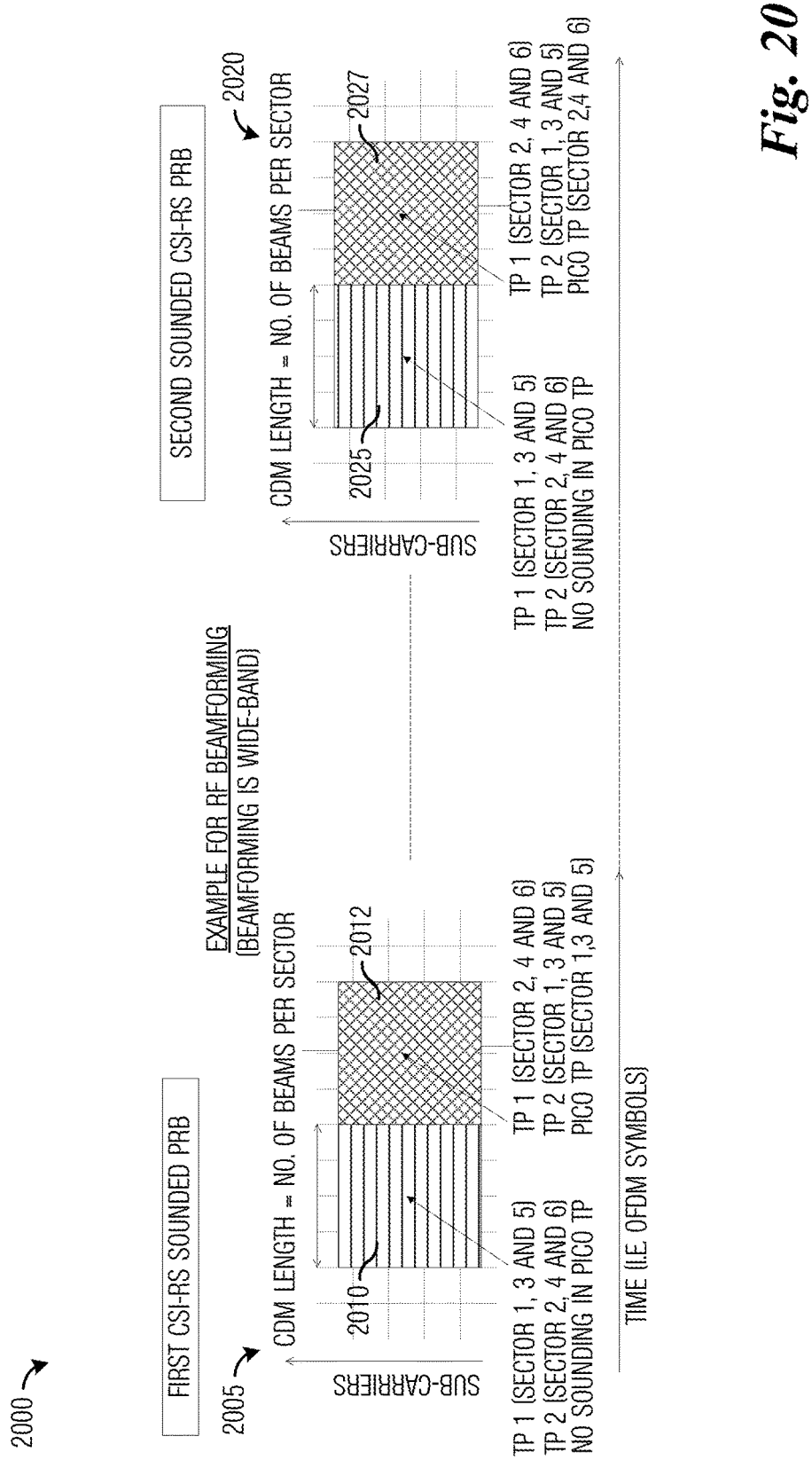
FIG. 20 illustrates a time-frequency diagram of CSI-RS sounded PRBs including wide-band beamformed reference and/or control signals for the second example of multiplexing for HetNet illustrated in FIGS. 19A and 19B according to example embodiments described herein.

FIG. 20 illustrates a time-frequency diagram 2000 of CSI-RS sounded PRBs including wide-band beamformed reference and/or control signals for the second example of multiplexing for HetNet illustrated in FIGS. 19A and 19B. Time-frequency diagram 2000 illustrates CSI-RS sounded PRBs including digital or RF wide-band beamformed reference and/or control signals for a HetNet that includes a low power TP located in sector 1 of a first high power TP. Time-frequency diagram 2000 displays a first CSI-RS sounded PRB 2005 and a second CSI-RS sounded PRB 2020. In first time instance 2010, the first high power TP sounds beamformed reference and/or control signals in sectors 1, 3, and 5, while the second high power TP sounds beamformed reference and/or control signals in sectors 2, 4, and 6. Since the low power TP is located in the sector 1 of the first high power TP, the low power TP performs no sounding. In a second time instance 2012, the first high power TP sounds beamformed reference and/or control signals in sectors 2, 4, and 6, while the second high power TP sounds beamformed reference and/or control signals in sectors 1, 3, and 5. Since the first high power TP is not sounding in the sector 1, the low power TP is then able to sound reference and/or control signals (in its own sectors 1, 3, and 5, for example). In a third time instance 2025 in second CSI-RS sounded PRB 2020, the first high power TP sounds beamformed reference and/or control signals in sectors 1, 3, and 5, while the second high power TP sounds beamformed reference and/or control signals in sectors 2, 4, and 6. Since the low power TP is located in the sector 1 of the first high power TP, the low power TP performs no sounding. In a fourth time instance 2027, the first high power TP sounds beamformed reference and/or control signals in sectors 2, 4, and 6, while the second high power TP sounds beamformed reference and/or control signals in sectors 1, 3, and 5. Since the first high power TP is not sounding in the sector 1, the low power TP is able to sound reference and/or control signals. The low power TP rotates its active and inactive sectors so that it is able to sound in a remainder of its sectors (the low power TP sounds in its sectors 2, 4, and 6, for example). Alternatively, instead of including one cycle per CSI-RS sounded PRB and requiring two CSI-RS sounded PRBs as shown here for the low power TP to sound its beamformed reference and/or control signals, both the cycles of the beamformed reference and/or control signals of the low power TP may be performed per CSI-RS sounded PRB, but a higher overhead may be required.

Unlike the first example beamformed reference and/or control signal sounding technique shown in FIGS. 17A-17C, the second example beamformed reference and/or control signal sounding technique shown in FIGS. 19A-19B fits more readily into the multiplexing techniques for beamformed reference and/or control signal sounding for high power TPs discussed previously since modifications of the required sounding resources per CSI-RS sounded PRBs are not required when low power TPs are contained in the coverage area of Marco TPs. As an illustrative example, the first example beamformed reference and/or control signal sounding technique adds a third sounding resource (shown in FIG. 17C) to support rotation of active and inactive sectors by low power TP 1710. This third sounding resource can either be added to one CSI-RS sounded PRB (increasing the overhead per PRB) or be included in a second sounded PRB. In either case the resources needed per CSI-RS sounded PRB would need to be dynamically changed depending upon how many Pico TPs are contained in the coverage area of the high power TP. For the technique shown in FIG. 19A-19B, however the resources are more evenly distributed and can be constant per CSI-RS sounded PRB, while requiring the sounding to be done over several PRBs.

Figure 21:
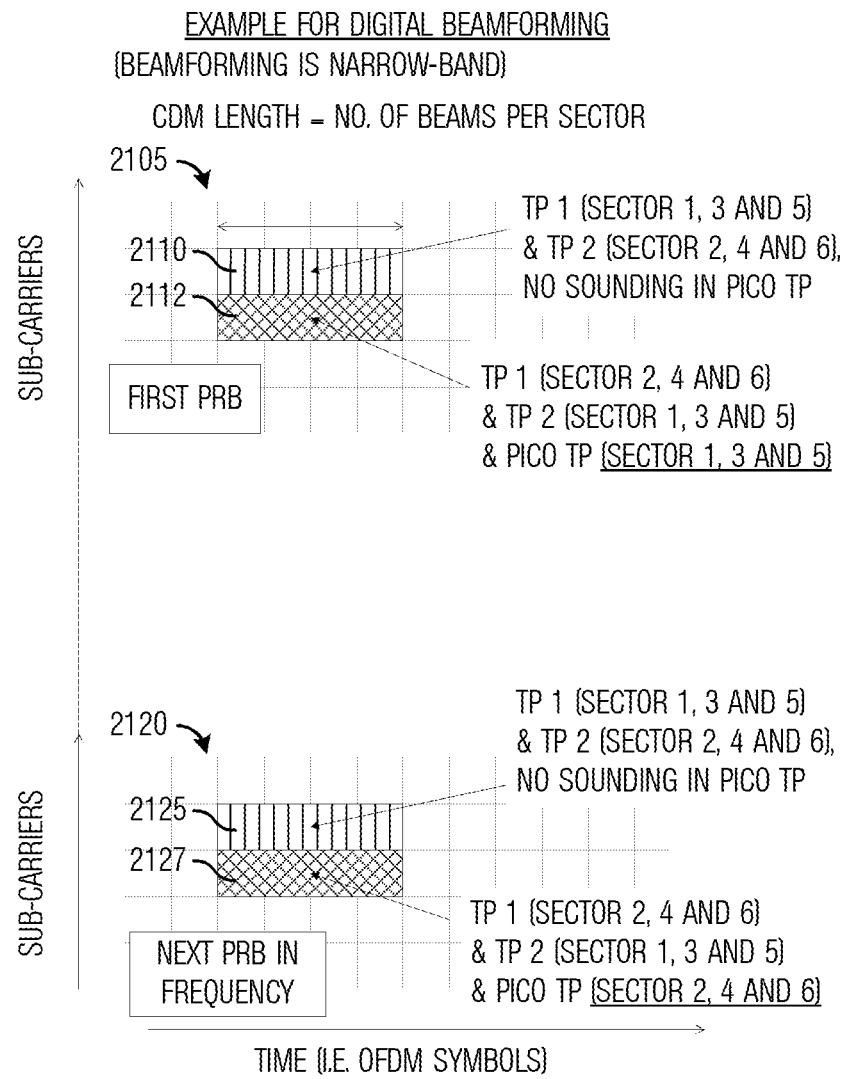
FIG. 21 illustrates a time-frequency diagram of CSI-RS sounded PRBs including narrow-band beamformed reference and/or control signals according to example embodiments described herein.

In a situation where digital beamforming is performed, different cycles may be multiplexed in different PRBs in the frequency domain. The frequency separation of the different CSI-RS sounded PRBs would need to be lower than the coherence bandwidth of the UEs served by the low power TP. Digital beamforming is particularly attractive with the expectedly flat channels in mmWave communications systems. FIG. 21 illustrates a time-frequency diagram 2100 of CSI-RS sounded PRBs including narrow-band beamformed reference and/or control signals. Time-frequency diagram 2100 illustrates CSI-RS sounded PRBs including digital narrow-band beamformed reference and/or control signals for a HetNet that includes a low power TP located in sector 1 of a first high power TP. Time-frequency diagram 2100 displays a first CSI-RS sounded PRB 2105 and a second CSI-RS sounded PRB 2120. In a first frequency band 2110, the first high power TP sounds beamformed reference and/or control signals in sectors 1, 3, and 5, while the second high power TP sounds beamformed reference and/or control signals in sectors 2, 4, and 6. Since the low power TP is located in the sector 1 of the first high power TP, the low power TP performs no sounding. In a second frequency band 2112, the first high power TP sounds beamformed reference and/or control signals in sectors 2, 4, and 6, while the second high power TP sounds beamformed reference and/or control signals in sectors 1, 3, and 5. Since the first high power TP is not sounding in the sector 1, the low power TP is able to sound reference and/or control signals (in its own sectors 1, 3, and 5, for example). In a third frequency band 2125 in second CSI-RS sounded PRB 2120, the first high power TP sounds beamformed reference and/or control signals in sectors 1, 3, and 5, while the second high power TP sounds beamformed reference and/or control signals in sectors 2, 4, and 6. Since the low power TP is located in the sector 1 of the first high power TP, the low power TP performs no sounding. In a fourth frequency band 2127 in second CSI-RS sounded PRB 2120, the first high power TP sounds beamformed reference and/or control signals in sectors 2, 4, and 6, while the second high power TP sounds beamformed reference and/or control signals in sectors 1, 3, and 5. Since the first high power TP is not sounding in the sector 1, the low power TP is able to sound reference and/or control signals. The low power TP rotates its active and inactive sectors so that it is able to sound in remainder of its sectors (the low power TP sounds in its sectors 2, 4, and 6, for example).

In the example beamformed reference and/or control signal sounding techniques for HetNets presented previously, it has been assumed that the low power TPs fit within a single sector of a high power TP. However, this is not always the case. According to an example embodiment, different angular multiplexing techniques are used for the high power TPs and the low power TPs.

Figure 22A:
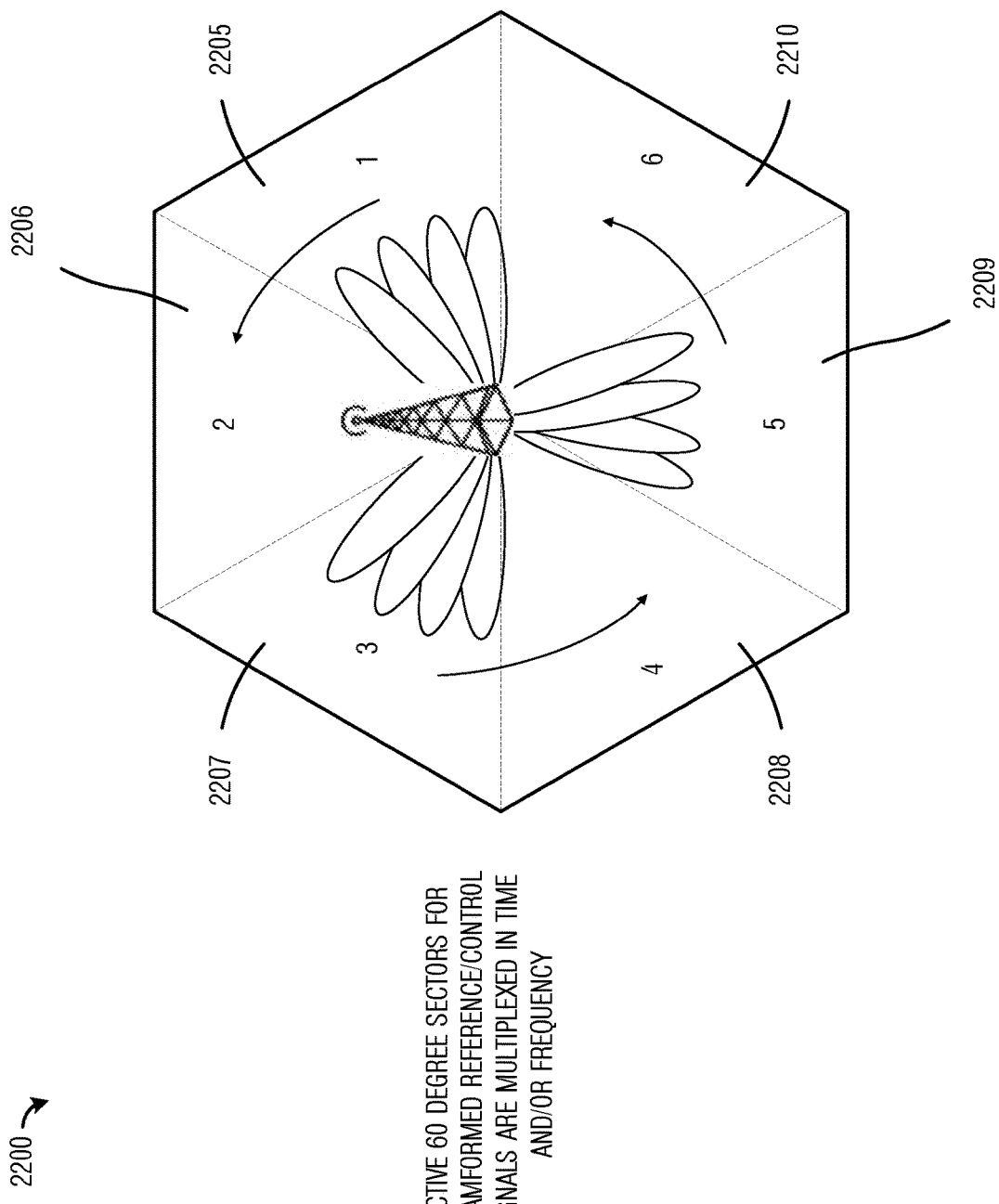
FIG. 22A illustrates a TP and associated coverage area highlighting a first example angular multiplexing technique according to example embodiments described herein.

FIG. 22A illustrates a TP 2200 and associated coverage area highlighting a first example angular multiplexing technique. The first example angular multiplexing technique involves every other sector of TP 2200 starting with the first sector being active in a first cycle with every other sector starting with the second sector being inactive. Then, in a second cycle, the sector states switch, with active sectors becoming inactive and inactive sectors becoming active. As shown in FIG. 22A, in the first cycle, sectors 2205, 2207, and 2209 are active while sectors 2206, 2208, and 2210 are inactive. In the second cycle, sectors 2206, 2208, and 2210 are active and sectors 2205, 2207, and 2209 are inactive. The cycles may continue in a cyclic manner.

For discussion purposes, consider a situation where the individual transmission beams are 15 degrees wide, then 8 (=4 beam×2 rotations) time or frequency resources are needed to sound beamformed reference signals for the full 360 degree when sector-specific scrambling codes are used. If sector-specific scrambling codes are not used, then 24 (=12 beams×2 rotations) time or frequency resources are needed to sound beamformed reference signals. Due to the angular separation of the beam groups in each sector plus the fact that only two sector states are needed (i.e., one cycling of cell states or two rotations), this first example angular multiplexing technique potentially has the lowest overhead when sector-specific scrambling codes are used.

Figure 22B:
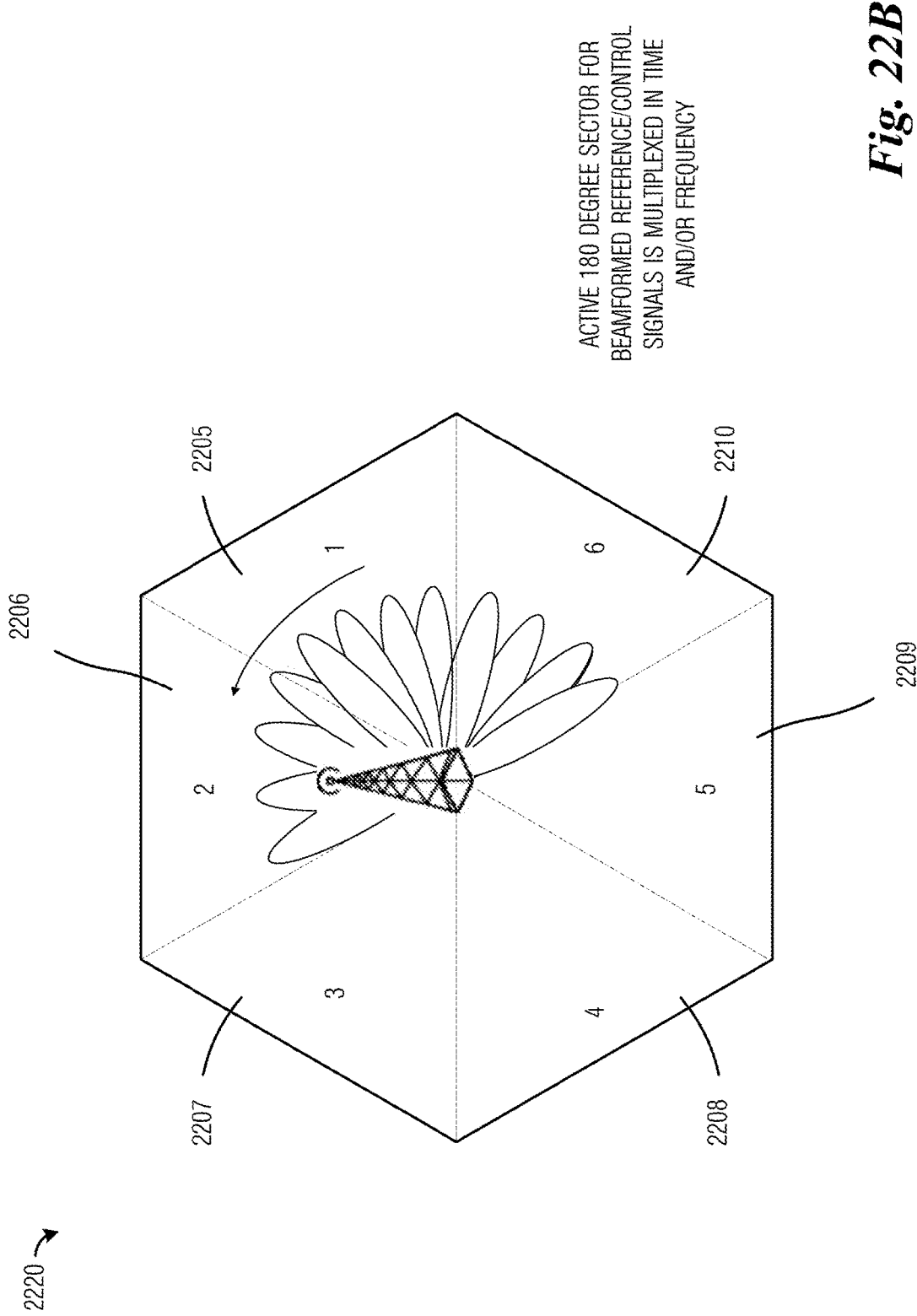
FIG. 22B illustrates a TP and associated coverage area highlighting a second example angular multiplexing technique according to example embodiments described herein.

FIG. 22B illustrates a TP 2220 and associated coverage area highlighting a second example angular multiplexing technique. The second example angular multiplexing technique involves a first contiguous half of the sectors of TP 2220 being active in a first cycle and a second contiguous half of the sectors of TP 2220 being inactive. Then, in a second cycle, the first contiguous half of the sectors is inactive while the second contiguous half of the sectors is active. As shown in FIG. 22B, the first contiguous half of the sectors comprises sectors 2210, 2205, and 2206 and the second contiguous half of the sectors comprises sectors 2207, 2208, and 2209. The cycles may continue in a cyclic manner. It is noted that the contiguous halves of the sectors are presented for discussion purposes only and that the second example angular multiplexing technique is operable with other contiguous halves of the sectors.

For discussion purposes, consider a situation where the individual transmission beams are 15 degrees wide, then 24 (=12 beams×2 rotations) time or frequency resources are needed to sound beamformed reference signals. It is possible to further reduce the overhead if neighboring active sectors are able to reuse the time or frequency resources.

Figure 22C:
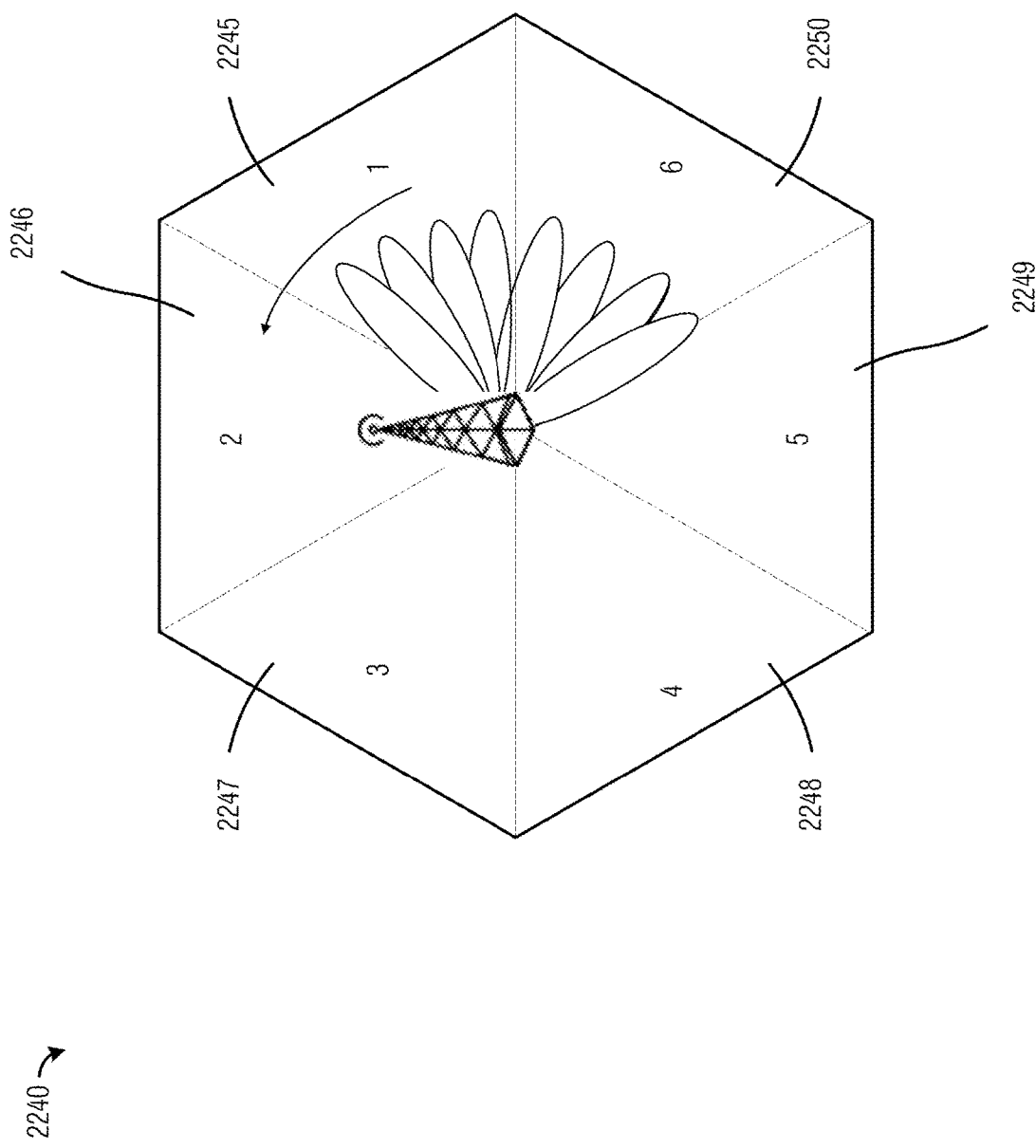
FIG. 22C illustrates a TP and associated coverage area highlighting a third example angular multiplexing technique according to example embodiments described herein.

FIG. 22C illustrates a TP 2240 and associated coverage area highlighting a third example angular multiplexing technique. The third example angular multiplexing technique involves a first combination of two contiguous sectors being active in a first cycle, while a second combination of two contiguous sectors and a third combination of two contiguous sectors are inactive. Then, in a second cycle, the first combination of two contiguous sectors and the third combination of two contiguous sectors are inactive while the second combination of two contiguous sectors is active, followed by a third cycle where the first combination of two contiguous sectors and the second combination of two contiguous sectors are inactive while the third combination of two contiguous sectors is active. As shown in FIG. 22C, the first combination of two contiguous sectors comprises sectors 2245 and 2250, the second combination of two contiguous sectors comprises sectors 2246 and 2247, and the third combination of two contiguous sectors comprises sectors 2248 and 2249. The cycles may continue in a cyclic manner. It is noted that the combinations of two contiguous sectors are presented for discussion purposes only and that the third example angular multiplexing technique is operable with other combinations of two contiguous sectors.

For discussion purposes, consider a situation where the individual transmission beams are 15 degrees wide, then 24 (=8 beams×3 rotations) time or frequency resources are needed to sound beamformed reference signals. It is possible to further reduce the overhead if neighboring active sectors are able to reuse the time or frequency resources.

Figure 22D:
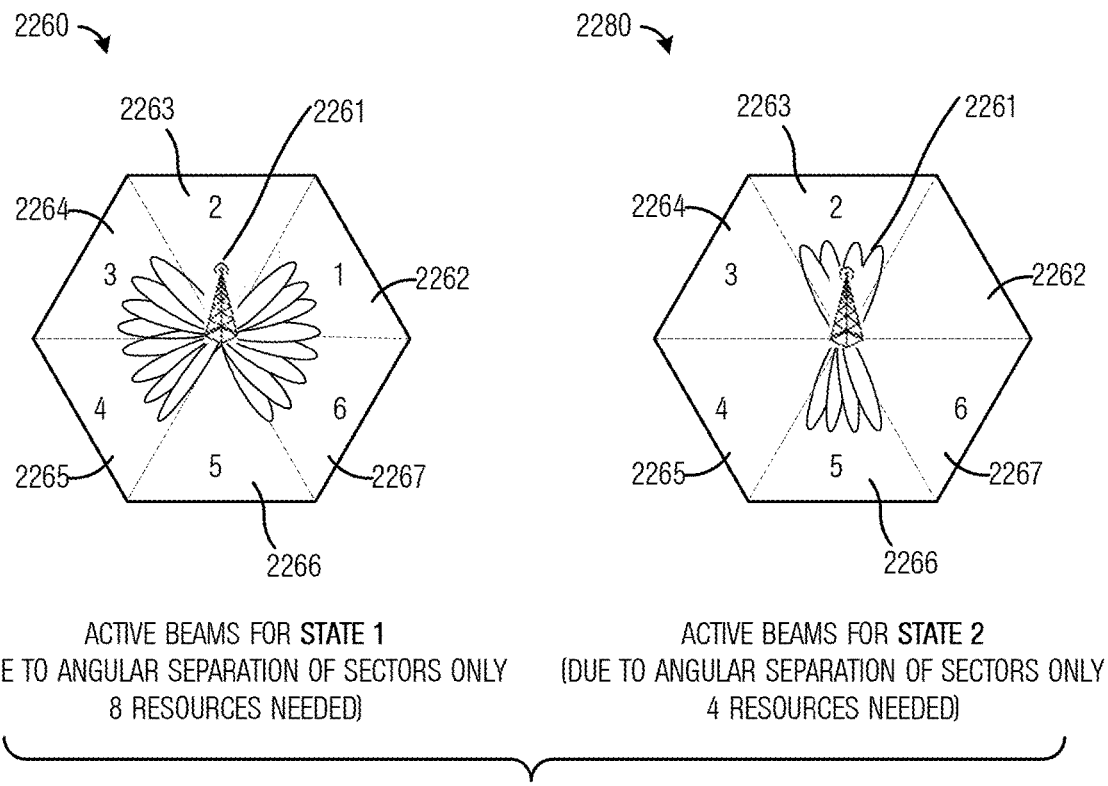
FIG. 22D illustrates active sector maps of a coverage area of a TP, highlighting a fourth example angular multiplexing technique according to example embodiments described herein.

FIG. 22D illustrates active sector maps 2260 and 2280 of a coverage area of a TP 2261, highlighting a fourth example angular multiplexing technique. The fourth example angular multiplexing technique involves two diametrically opposed combinations of two contiguous sectors being active in a first cycle while two diametrically opposed sectors are inactive. Then, in a second cycle, the two diametrically opposed combinations of two contiguous sectors are inactive and the two diametrically opposed sectors are active. As shown in the FIG. 22D, the two diametrically opposed combinations of two contiguous sectors comprise sectors 2262 and 2267, and 2264 and 2265, respectively. The two diametrically opposed sectors comprise sectors 2263 and 2266. The cycles may continue in a cyclic manner. It is noted that the two diametrically opposed combinations of two contiguous sectors and the diametrically opposed sectors are presented for discussion purposes only and that the third example angular multiplexing technique is operable with other combinations of diametrically opposed sectors.

For discussion purposes, consider a situation where the individual transmission beams are 15 degrees wide, then 12 (=4 beam resources in sector map 2280+8 beam resources in sector map 2260) time or frequency resources are needed to sound beamformed reference signals when sector-specific scrambling codes are used, while 24 (=8 beams resources in sector map 2280+16 beam resources in sector map 2260) time or frequency resources are needed to sound beamformed reference signals when sector-specific scrambling codes are not used.

The discussion of first through fourth example angular multiplexing techniques focuses on TPs with a coverage area divided into six 60 degree sectors. The first through fourth example angular multiplexing techniques are also operable with other coverage area configurations. Therefore the focus on 60 degree sectors should not be construed as being limiting to either the scope or spirit of the example embodiments.

Heretofore, the discussion of beamforming has focused only on azimuth direction beamforming. However, beamforming at a TP may also be performed in the elevation direction. Beamforming in the elevation direction is especially applicable to beamforming the CSI-RS. According to an example embodiment, a best azimuth beam direction is determined with wide elevation beams in a first step and after the UE provides feedback regarding the azimuth beams, elevation beam sweeping is performed on the best azimuth beam in a second step to select the elevation beams. Detailed discussion of elevation and azimuth beam sweeping is provided in U.S. Provisional Application 62/076,343, filed Nov. 6, 2014, entitled "System and Method for Beam-Formed Channel State Reference Signals," which is hereby incorporated herein by reference. The multiplexing of the beams for the first step may utilize any of the techniques disclosed herein. With regards to the second step (elevation beam sweeping) multiplexing of the elevation beams between adjacent TPs may be performed. However, since only the best azimuth beam is selected for sounding, the multiplexing of the elevation beams may not be necessary.

According to an alternate example embodiment, the beamformed CSI-RS are beamformed into narrow beams in both the azimuth and elevation directions and the TP sweeps through all combinations of azimuth and elevation beams.

Figure 23:
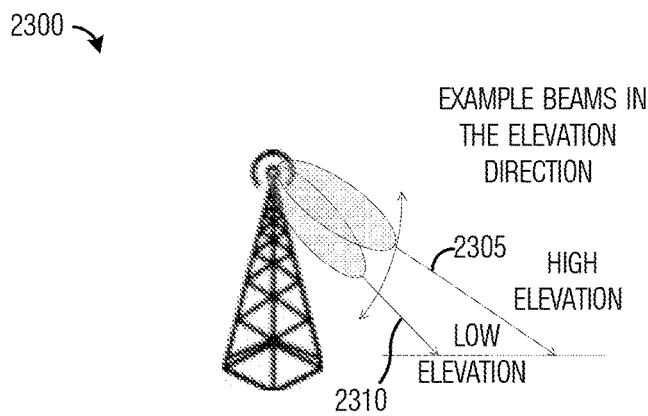
FIG. 23 illustrates a side view of a TP highlighting beams in the elevation direction according to example embodiments described herein.

FIG. 23 illustrates a side view of a TP 2300 highlighting beams in the elevation direction. As shown in FIG. 23, TP 2300 transmits beams in a high elevation 2305 and in a low elevation 2310. The availability of the elevation beams increases the number of beams that are multiplexed. Although the discussion focuses on two elevation beams (high elevation and low elevation beams), the example embodiments presented herein are operable with any number of elevation beams. Therefore, the discussion of two elevation beams should not be construed as being limiting to either the scope or spirit of the example embodiments.

Figure 24:
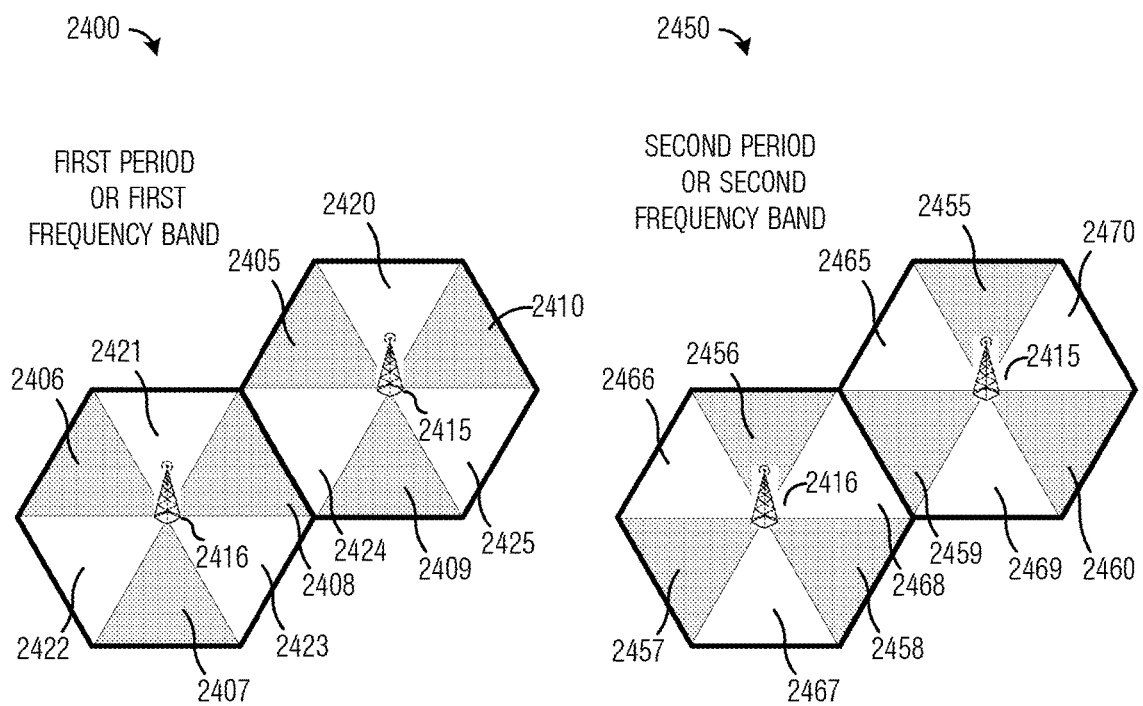
FIG. 24 illustrates an example beamformed reference and/or control signal sounding technique in both elevation and azimuth directions according to example embodiments described herein.

FIG. 24 illustrates an example beamformed reference and/or control signal sounding technique in both elevation and azimuth directions. During a first period or frequency band 2400, shaded sectors 2405-2410 are active and TPs 2415 and 2416 are sounding beamformed reference and/or control signals at a first elevation (e.g., high elevation). Unshaded sectors 2420-2425 are sounding beamformed reference and/or control signals at a second elevation (e.g., low elevation). During a second period or frequency band 2450, shaded sectors 2455-2460 are active and TPs 2415 and 2416 are sounding beamformed reference and/or control signals at the first elevation. Unshaded sectors 2465-2470 are sounding beamformed reference and/or control signals at the second elevation. If additional elevation beams are supported, additional periods or frequency bands may be used to allow the sounding of beamformed reference and/or control signals in the additional elevation beams.

For some reference signals, such as the CSI-RS, configuration information and feedback modes may need to be signaled to the UEs. In order to ensure that a UE knows how the different available CSI-RS resources in each RB are mapped in the time and frequency domains for each TP and how the UE should perform feedback, each TP (or a master TP responsible for signaling for a plurality of TPs) signals a CSI-RS configuration to the UEs. The CSI-RS configuration may be signaled on a broadcast control channel (BCCH), for example. The CSI-RS configuration also specifies how the angular beams in each sector are mapped to codes (for CDM resources) or time slots (for time division multiplexed (TDM)) resources. Different mappings are possible for sectors within a TP or across TPs. The CSI-RS configuration may also include signaling options for and sector-specific scrambling codes.

Each UE may have multiple CSI-RS feedback processes, in a similar fashion as described in the 3GPP LTE Release-11 technical standards. There may be one CSI-RS feedback resource per CSI-RS resource, i.e., one CSI-RS feedback resource per CDM time and/or frequency resource.

For release 11 LTE it is possible that multiple TPs (with 1 antenna port each) may be mapped to 1 CSI-RS resource so that coherent joint transmission (JT) can be implemented with a single CSI-RS resource with one feedback process. In a beamformed CSI-RS communications system as described herein, where beams from different TPs are multiplexed spatially in time and/or frequency, each CSI-RS resource contains only different beams from one sector for each TP. This is intentionally done to allow for different code or time mappings for different TPs. Therefore each CSI-RS feedback process corresponds to a certain sector for 1 TP and multiple CSI-RS processes may be processed in 1 RB, where each process corresponds to a different TP.

Figure 25:
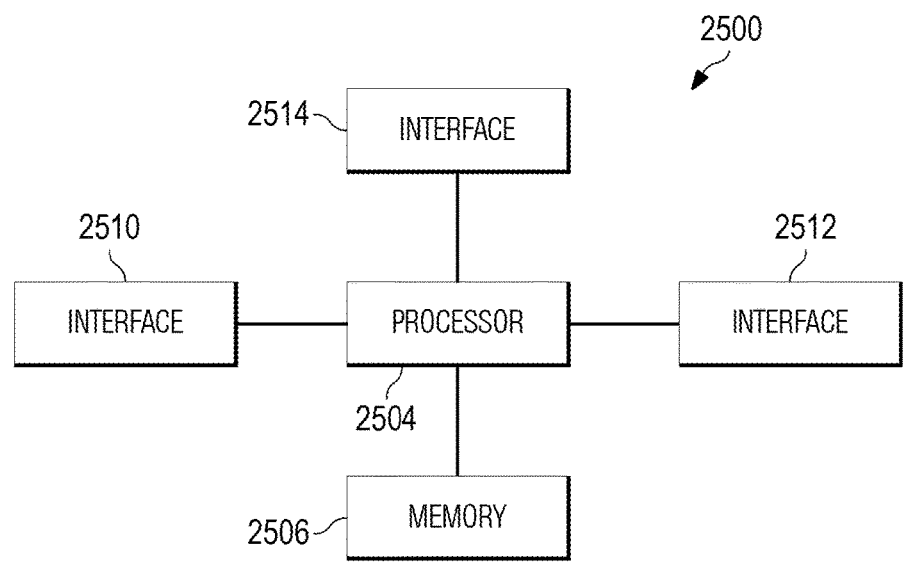
FIG. 25 illustrates a block diagram of an embodiment processing system for performing methods described herein.

FIG. 25 illustrates a block diagram of an embodiment processing system 2500 for performing methods described herein, which may be installed in a host device. As shown, the processing system 2500 includes a processor 2504, a memory 2506, and interfaces 2510-2514, which may (or may not) be arranged as shown in FIG. 25. The processor 2504 may be any component or collection of components adapted to perform computations and/or other processing related tasks, and the memory 2506 may be any component or collection of components adapted to store programming and/or instructions for execution by the processor 2504. In an embodiment, the memory 2506 includes a non-transitory computer readable medium. The interfaces 2510, 2512, 2514 may be any component or collection of components that allow the processing system 2500 to communicate with other devices/components and/or a user. For example, one or more of the interfaces 2510, 2512, 2514 may be adapted to communicate data, control, or management messages from the processor 2504 to applications installed on the host device and/or a remote device. As another example, one or more of the interfaces 2510, 2512, 2514 may be adapted to allow a user or user device (e.g., personal computer (PC), etc.) to interact/communicate with the processing system 2500. The processing system 2500 may include additional components not depicted in FIG. 25, such as long term storage (e.g., non-volatile memory, etc.).

In some embodiments, the processing system 2500 is included in a network device that is accessing, or part otherwise of, a telecommunications network. In one example, the processing system 2500 is in a network-side device in a wireless or wireline telecommunications network, such as a base station, a relay station, a scheduler, a controller, a gateway, a router, an applications server, or any other device in the telecommunications network. In other embodiments, the processing system 2500 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 26:
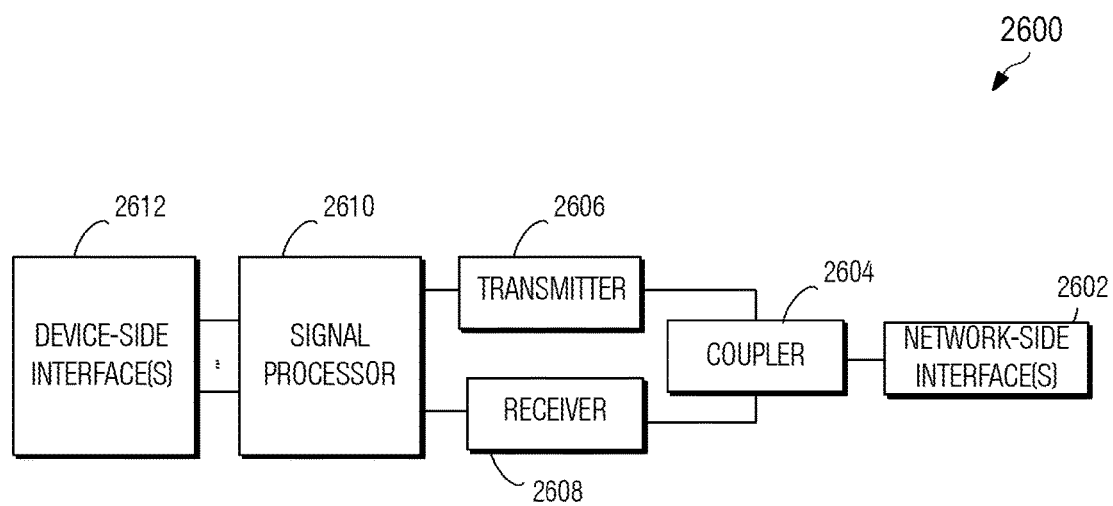
FIG. 26 illustrates a block diagram of a transceiver adapted to transmit and receive signaling over a telecommunications network according to example embodiments described herein.

In some embodiments, one or more of the interfaces 2510, 2512, 2514 connects the processing system 2500 to a transceiver adapted to transmit and receive signaling over the telecommunications network. FIG. 26 illustrates a block diagram of a transceiver 2600 adapted to transmit and receive signaling over a telecommunications network. The transceiver 2600 may be installed in a host device. As shown, the transceiver 2600 comprises a network-side interface 2602, a coupler 2604, a transmitter 2606, a receiver 2608, a signal processor 2610, and a device-side interface 2612. The network-side interface 2602 may include any component or collection of components adapted to transmit or receive signaling over a wireless or wireline telecommunications network. The coupler 2604 may include any component or collection of components adapted to facilitate bi-directional communication over the network-side interface 2602. The transmitter 2606 may include any component or collection of components (e.g., up-converter, power amplifier, etc.) adapted to convert a baseband signal into a modulated carrier signal suitable for transmission over the network-side interface 2602. The receiver 2608 may include any component or collection of components (e.g., down-converter, low noise amplifier, etc.) adapted to convert a carrier signal received over the network-side interface 2602 into a baseband signal. The signal processor 2610 may include any component or collection of components adapted to convert a baseband signal into a data signal suitable for communication over the device-side interface(s) 2612, or vice-versa. The device-side interface(s) 2612 may include any component or collection of components adapted to communicate data-signals between the signal processor 2610 and components within the host device (e.g., the processing system 2500, local area network (LAN) ports, etc.).

The transceiver 2600 may transmit and receive signaling over any type of communications medium. In some embodiments, the transceiver 2600 transmits and receives signaling over a wireless medium. For example, the transceiver 2600 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 2602 comprises one or more antenna/radiating elements. For example, the network-side interface 2602 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 2600 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

Although the present disclosure and its advantages have been described in detail, it should be understood that various changes, substitutions and alterations can be made herein without departing from the spirit and scope of the disclosure as defined by the appended claims.

What is claimed is:

1. A method for operating a device, the method comprising:

determining, by the device, a configuration of a first transmission point (TP) in accordance with configuration information of the first TP and configuration information of neighboring TPs, wherein the configuration comprises at least one of a sounding rate for beamformed signals, or a mapping of transmission beam indices to codewords or time slots, and wherein the configuration indicates multiplexed beamformed signals in a spatial domain and at least one of a time domain or a frequency domain, and wherein the beamformed signals comprise at least one of beamformed reference signals or beamformed control signals; and instructing, by the device, use of the configuration.

2. The method of claim 1, wherein the device is the first TP, and wherein determining the configuration comprises one of retrieving the configuration from one of a memory or a database, or receiving the configuration in a message.

3. The method of claim 1, wherein instructing the use of the configuration comprises sending the configuration in a message.

4. The method of claim 1, wherein the device is the first TP, and wherein the method further comprises:
coordinating, by the device, with the neighboring TPs to share the configuration information of the first TP and the configuration information of the neighboring TPs.

5. The method of claim 4, wherein instructing the use of the configuration comprises signaling information regarding the configuration to a user equipment in a coverage area served by the first TP.

6. The method of claim 1, wherein the device is a network entity, and wherein instructing the use of the configuration further comprises instructing at least one of a time resource mapping for different beamformed directions, a frequency resource mapping for different beamformed directions, or a timing cycle for the beamformed signals.

7. The method of claim 6, wherein instructing the use of the configuration further comprises instructing at least one of sector-specific scrambling codes, cell-specific scrambling codes, feedback mode options, or a maximum number of feedback processes.

8. The method of claim 6, wherein instructing the use of the configuration prompts the first TP to instruct use of the configuration to a UE in a coverage area served by the first TP.

9. The method of claim 1, wherein determining the configuration comprises:
altering a multiplexing of the beamformed signals in the spatial domain and the at least one of the time domain or the frequency domain; and
generating the configuration from the altered multiplexing of the beamformed signals.

10. The method of claim 1, wherein the device is the first TP, and wherein instructing the use of the configuration further comprises instructing at least one of time and/or frequency locations for beamformed signals resources, mappings of communications further resources to coverage area sectors and TPs, an indicator of a use of sector-specific scrambling codes, scrambling code indices, UE feedback schemes, or a maximum number of feedback processes which can be handled by the TP.

11. The method of claim 1, wherein the first TP is part of a homogeneous communications system, wherein the first TP has a sectorized coverage area, and wherein determining the configuration comprises:
multiplexing the beamformed signals so that a sounding TP out of a plurality of TPs sharing a common coverage area sector edge sounds the common edge in at least one of a single time instance or a frequency band.

12. The method of claim 1, wherein the first TP is part of a heterogeneous communications system (HetNet), wherein the first TP has a sectorized coverage area, wherein a low power TP is located in the sectorized coverage area of the first TP, and wherein determining the configuration comprises:
multiplexing the beamformed signals so that a sounding TP out of a plurality of TPs sharing a common coverage area sector edge of a common coverage area that fully encompasses the low power TP and a low power coverage area of the sounding TP sounds the common edge in at least one or a single time instance or a frequency band.

13. The method of claim 1, wherein the first TP is part of a heterogeneous communications system (HetNet), wherein the first TP is a low power TP fully located in a sectorized coverage area of a high power TP, and wherein determining the configuration comprises:
multiplexing the beamformed signals so that the low power TP is transmitting beamformed signals only when the high power TP is not transmitting beamformed signals.

14. The method of claim 1, wherein the first TP is part of a communications system with overlapping coverage areas, and wherein determining the configuration comprises:
multiplexing the beamformed signals so that only one TP out of a plurality of TPs sharing an overlapping coverage area sounds the overlapping coverage area in at least one of a single time instance or a frequency band.

15. The method of claim 1, wherein the beamformed signals are multiplexed in at least one of an azimuth direction or an elevation direction.

16. The method of claim 1, wherein the beamformed signals are multiplexed in a time division multiplexed (TDM) manner or multiplexed in a code division multiplexed (CDM) manner.

17. The method of claim 16, wherein the beamformed signals are further scrambled with sector-specific scrambling codes when CDM is used.

18. A method for operating a user equipment (UE), the method comprising:
receiving, by the UE, configuration information regarding a configuration from a transmission point (TP), wherein the configuration information includes information regarding a multiplexing of beamformed signals in a spatial domain and at least one of a time domain or a frequency domain, and wherein the beamformed signals comprise at least one of beamformed reference signals or beamformed control signals; and
receiving, by the UE, a subset of the beamformed signals in accordance with the information.

19. The method of claim 18, wherein the subset of the beamformed signals is multiplexed in a time division multiplexing (TDM) manner or multiplexed in a code division multiplexing (CDM) manner.

20. The method of claim 19, wherein the subset of the beamformed signals is further scrambled with sector-specific scrambling codes when the CDM is used.

21. The method of claim 18, wherein the information comprises at least one of a location of a beamformed signal resource in each beamformed signal sounded physical resource block, a mapping of a beamformed signal resource to coverage area sectors and TPs, a rate in which the beamformed signals are sounded in at least one of the time domain and the frequency domain, a mapping of beam indices to one of code words and time slots for each coverage area sector or each TP, a flag indicating use of sector-specific scrambling, scrambling code indices for each coverage area sector or each TP, an indicator of a feedback scheme, or a maximum number of feedback processes that the UE can perform.

22. A device comprising:
a memory storage comprising instructions; and
one or more processors in communication with the memory, wherein the one or more processors execute the instructions to:
determine a configuration of a first transmission point (TP) in accordance with configuration information of the first TP and configuration information of neighboring TPs, wherein the configuration comprises at least one of a sounding rate for beamformed signals, or a mapping of transmission beam indices to codewords or time slots, and wherein the configuration indicates multiplexed beamformed signals in a spatial domain and at least one of a time domain or a frequency domain, and wherein the beamformed signals comprise at least one of beamformed reference signals or beamformed control signals, and
instruct use of the configuration.

23. The device of claim 22, wherein the one or more processors furtherexecute the instructions to alter a multiplexing of the beamformed signals in the spatial domain and the at least one of the time domain or the frequency domain, and to generate the configuration from the altered multiplexing of the beamformed signals.

24. The device of claim 22, wherein the first TP is part of a homogeneous communications system, wherein the first TP has a sectorized coverage area, and wherein the one or more processes further execute instructions to multiplex the beamformed signals so that a sounding TP out of a plurality of TPs sharing a common coverage area sector edge sounds the common edge in at least one of a single time instance or a frequency band.

25. The device of claim 22, wherein the first TP is part of a heterogeneous communications system (HetNet), wherein the first TP has a sectorized coverage area, wherein a low power TP is located in the sectorized coverage area of the first TP, and wherein the one or more processors further execute instructions to multiplex the beamformed signals so that a sounding TP out of a plurality of TPs sharing a common coverage area sector edge of a common coverage area that fully encompasses the low power TP and a low power coverage area of the sounding TP sounds the common edge in at least one of a single time instance or a frequency band.

26. The device of claim 22, wherein the first TP is part of a heterogeneous communications system (HetNet), wherein the first TP is a low power TP fully located in a sectorized coverage area of a high power TP, and wherein the one or more processors further execute instructions to multiplex the beamformed signals so that the low power TP is transmitting beamformed signals only when the high power TP is not transmitting beamformed signals.

27. The device of claim 22, wherein first TP is part of a communications system with overlapping coverage areas, and wherein the one or more processors further execute instructions to multiplex the beamformed signals so that only one TP out of a plurality of TPs sharing an overlapping coverage area sounds the overlapping coverage area in at least one of a single time instance or a frequency band.

28. The device of claim 22, wherein the device is the first TP, and wherein the one or more processors further execute instructions to coordinate with the neighboring TPs to share the configuration information of the first TP and the configuration information of the neighboring TPs.

* * * * *